United States Patent
Shinozaki

(10) Patent No.: US 9,582,863 B2
(45) Date of Patent: Feb. 28, 2017

(54) IMAGE PROCESSING APPARATUS, IMAGE PROCESSING METHOD, AND PROGRAM

(71) Applicant: Sony Semiconductor Solutions Corporation, Kanagawa (JP)

(72) Inventor: Hirotaka Shinozaki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 5 days.

(21) Appl. No.: 14/529,787

(22) Filed: Oct. 31, 2014

(65) Prior Publication Data

US 2015/0049223 A1 Feb. 19, 2015

Related U.S. Application Data

(63) Continuation of application No. 13/593,697, filed on Aug. 24, 2012, now Pat. No. 8,891,866.

(30) Foreign Application Priority Data

Aug. 31, 2011 (JP) ................................ 2011-190053
Mar. 27, 2012 (JP) ................................ 2012-070537

(51) Int. Cl.
*G06T 5/00* (2006.01)
*H04N 9/64* (2006.01)

(52) U.S. Cl.
CPC ............... *G06T 5/005* (2013.01); *G06T 5/00* (2013.01); *H04N 9/646* (2013.01); *G06T 2207/10024* (2013.01)

(58) Field of Classification Search
CPC . G06T 2207/10024; G06T 5/00; G06T 5/005; H04N 9/646
See application file for complete search history.

(56) References Cited

U.S. PATENT DOCUMENTS

| 4,698,843 | A | * | 10/1987 | Burt ....................... H04N 19/63 348/616 |
| 5,917,935 | A | | 6/1999 | Hawthorne et al. |
| 6,724,945 | B1 | | 4/2004 | Yen et al. |

(Continued)

FOREIGN PATENT DOCUMENTS

JP 2011-55038 3/2011

*Primary Examiner* — Jingge Wu
(74) *Attorney, Agent, or Firm* — Paratus Law Group, PLLC

(57) ABSTRACT

Provided is an image processing apparatus including an image signal correction section that performs an image correction process. The image signal correction section performs a direction determination process of detecting a direction having a minimum pixel value gradient as a pixel value gradient direction in a pixel area including a target pixel; a defect detection process of calculating a Laplacian based on a pixel value of a reference pixel in a minimum gradient direction detected in the direction determination process with respect to the target pixel, and determining presence or absence of a defect of the target pixel; and a defect correction process of performing calculation of a corrected pixel value, which is obtained by applying the pixel value of the reference pixel in the direction detected in the direction determination process, with respect to a target pixel from which a defect has been detected in the defect detection process.

9 Claims, 30 Drawing Sheets

(56) References Cited

U.S. PATENT DOCUMENTS

| | | | |
|---|---|---|---|
| 7,006,705 B2* | 2/2006 | Takayama | H04N 1/40056 250/201.2 |
| 7,015,961 B2* | 3/2006 | Kakarala | G06T 3/4015 348/222.1 |
| 7,408,569 B1 | 8/2008 | Yamaguchi | |
| 7,477,781 B1 | 1/2009 | Tanbakuchi | |
| 7,627,193 B2* | 12/2009 | Alon | G02B 27/0012 348/240.3 |
| 7,853,099 B2* | 12/2010 | Shinmei | H04N 5/357 348/222.1 |
| 2004/0114829 A1* | 6/2004 | LeFeuvre | G06T 7/40 382/275 |
| 2005/0219390 A1 | 10/2005 | Tajima et al. | |
| 2007/0071304 A1 | 3/2007 | Kuchii et al. | |
| 2007/0110319 A1 | 5/2007 | Wyatt et al. | |
| 2007/0145270 A1 | 6/2007 | Miyamoto et al. | |
| 2008/0012967 A1 | 1/2008 | Kuwabara | |
| 2008/0050007 A1 | 2/2008 | Oaki | |
| 2010/0066874 A1* | 3/2010 | Ishiga | G06T 5/002 348/252 |
| 2010/0278422 A1* | 11/2010 | Iketani | G06T 3/403 382/165 |
| 2011/0090240 A1* | 4/2011 | Cohen | G06T 5/20 345/589 |
| 2011/0090371 A1 | 4/2011 | Cote et al. | |
| 2011/0102624 A1 | 5/2011 | Hashizume | |

\* cited by examiner

FIG. 6

CALCULATE GRADIENT OF LOW FREQUENCY TEXTURE

CALCULATE GRADIENTS OF FOUR DIRECTIONS OF HORIZONTAL, VERTICAL, UPPER RIGHT, AND LOWER RIGHT DIRECTIONS AMONG ADJACENT G PIXELS OVER FOUR PIXELS

HORIZONTAL DIRECTION

VERTICAL DIRECTION

UPPER RIGHT DIRECTION

LOWER RIGHT DIRECTION $$gradH = \frac{1}{N_H}\sum_x\sum_y |G_{x,y} - G_{x+4,y}|$$

$$gradV = \frac{1}{N_V}\sum_x\sum_y |G_{x,y} - G_{x,y+4}|$$

$$gradA = \frac{1}{N_A}\sum_x\sum_y |G_{x,y} - G_{x+2,y-2}|$$

$$gradD = \frac{1}{N_D}\sum_x\sum_y |G_{x,y} - G_{x+2,y+2}|$$

(N IS NUMBER OF GRADIENTS IN EACH DIRECTION)

FIG. 7

CALCULATE GRADIENT OF LUMINANCE SIGNAL

① CALCULATE LUMINANCE SIGNAL BY ADDING AND AVERAGING FOUR RGGB PIXELS

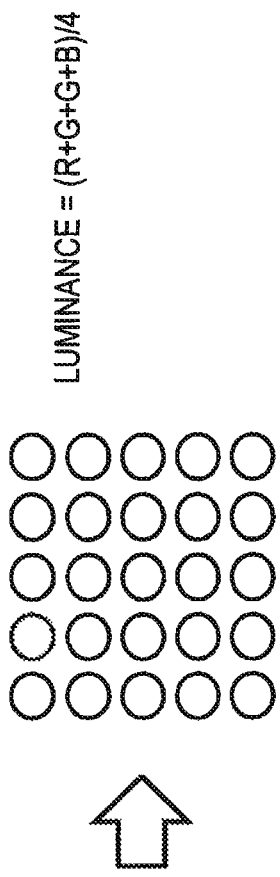

LUMINANCE = (R+G+G+B)/4

① CALCULATE GRADIENTS OF FOUR RGGB PIXELS OF FOUR DIRECTIONS OF HORIZONTAL, VERTICAL, UPPER RIGHT, AND LOWER RIGHT DIRECTIONS

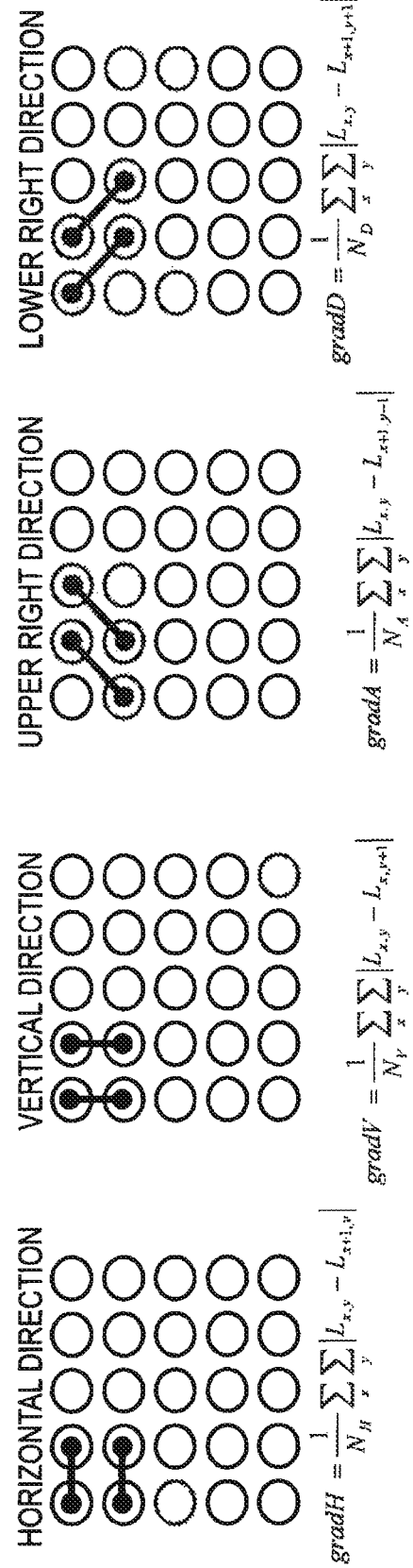

HORIZONTAL DIRECTION $$gradH = \frac{1}{N_H}\sum_x\sum_y |L_{x,y} - L_{x+1,y}|$$

VERTICAL DIRECTION $$gradV = \frac{1}{N_V}\sum_x\sum_y |L_{x,y} - L_{x,y+1}|$$

UPPER RIGHT DIRECTION $$gradA = \frac{1}{N_A}\sum_x\sum_y |L_{x,y} - L_{x+1,y-1}|$$

LOWER RIGHT DIRECTION $$gradD = \frac{1}{N_D}\sum_x\sum_y |L_{x,y} - L_{x+1,y+1}|$$

(N IS NUMBER OF GRADIENTS IN EACH DIRECTION)

FIG. 8

CALCULATE WEIGHTED AVERAGE VALUE OF EACH GRADIENT

GIVEN WEIGHTS ARE ADDED TO GRADIENTS OBTAINED BY THREE TYPES OF METHODS, SO THAT WEIGHTED AVERAGE IS OBTAINED $$gH = w_h gradH_h + w_l gradH_l + w_i gradH_i$$

- $w_h gradH_h$ : GRADIENT OF HIGH FREQUENCY TEXTURE
- $w_l gradH_l$ : GRADIENT OF LOW FREQUENCY TEXTURE
- $w_i gradH_i$ : GRADIENT OF LUMINANCE SIGNAL

NOTE: W IS WEIGHT

EXAMPLE:
HORIZONTAL DIRECTION

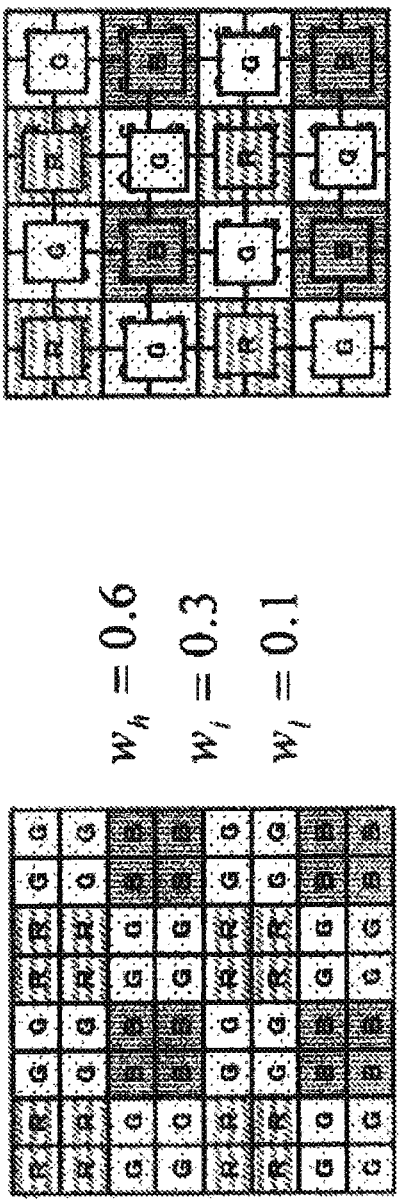

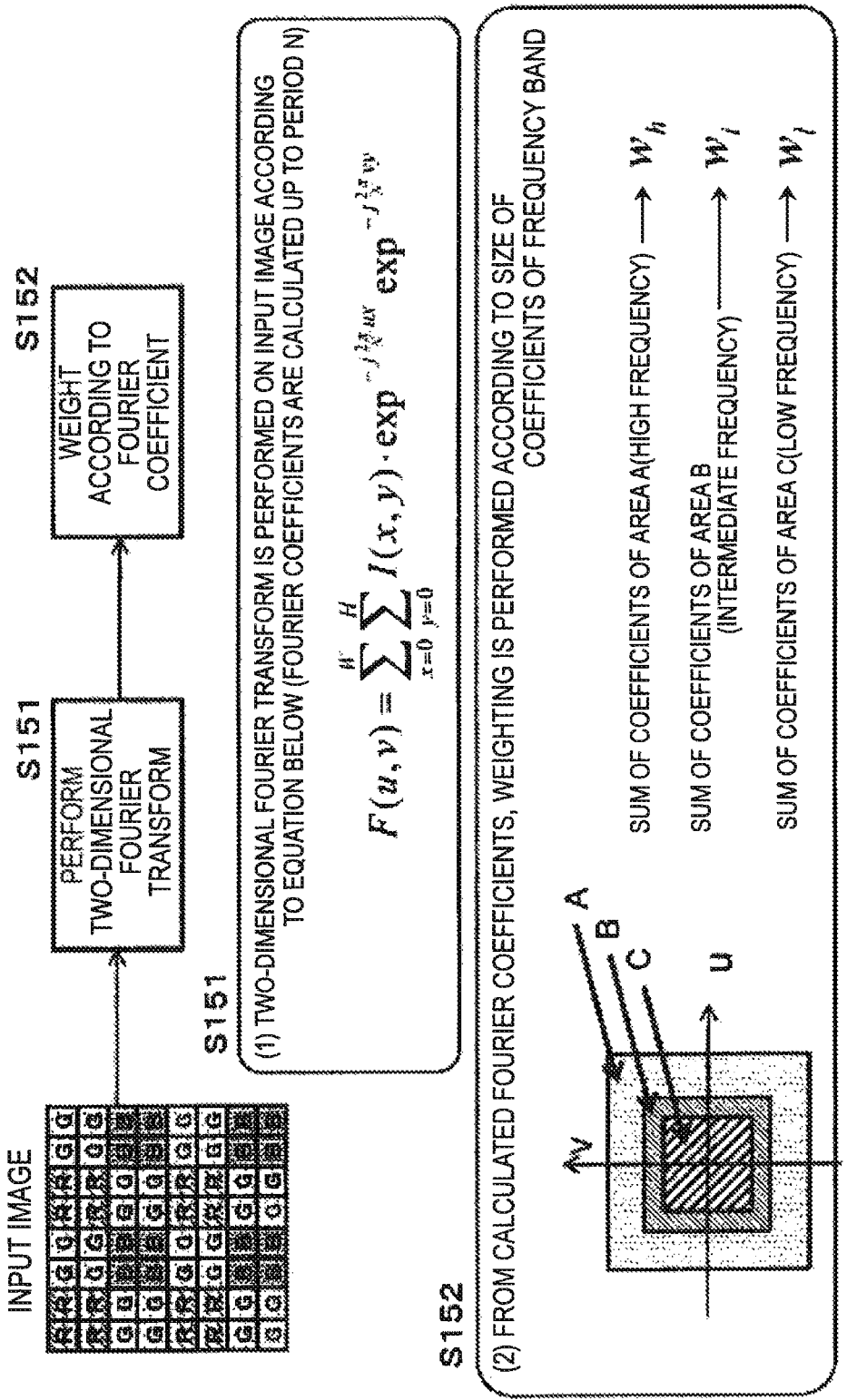

THIRD VARIATION

THIRD VARIATION
WHEN TYPE OF GRADIENT IS INCREASED

① FOUR-PIXEL ADDITION AVERAGE IS OBTAINED

② CALCULATE GRADIENT FROM SIGNAL FROM WHICH WEIGHTED AVERAGE IS OBTAINED

CALCULATE GRADIENT OF FOUR-PIXEL ADDITION AVERAGE

FIG. 16

FOURTH VARIATION

4 DIVISION WRGB ARRAY

FIG. 18
PIXEL INTERPOLATION
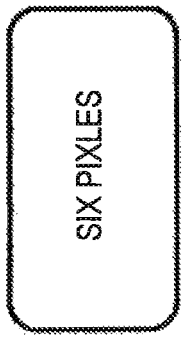  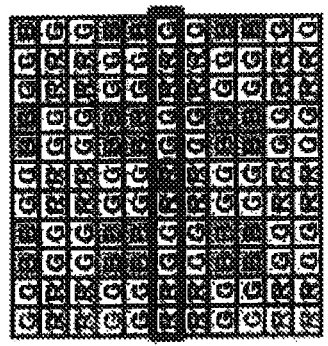
IN HORIZONTAL DIRECTION
SIX PIXLES
  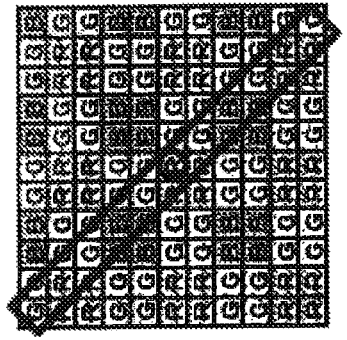
IN LOWER RIGHT DIRECTION
ONLY THREE PIXLES

FIG. 19
PIXEL INTERPOLATION
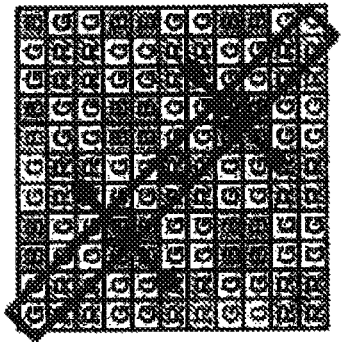
IN LOWER RIGHT DIRECTION
PIXELS ARE INTERPOLATED IN INTERNALLY DIVIDED POSITION USING TWO PIXELS CONNECTED BY LINE (INDICATED BY THICK LINE)
INCREASE NUMBER OF PIXELS TO BE USED IN DETECTION AND CORRECTION
ENSURE NUMBER OF FIVE PIXELS OF SAME COLOR INCLUDING TARGET PIXEL IN EACH DIRECTION

FIG. 21

PIXEL INTERPOLATION

501 TARGET PIXEL
521 REFERENCE PIXEL INTERPOLATION POSITION

INTERPOLATION PIXEL VALUE Ra
OF REFERENCE PIXEL INTERPOLATION POSITION $$Ra = \sum_{i,j} \alpha_{i,j} R(i,j)$$
$$= \alpha \times R(7,6) + \beta \times R(7,9) + \gamma \times R(10,9)$$

IN LOWER RIGHT DIRECTION
(X) →
1 2 3 4 5 6 7 8 9 10 11
(Y) →

FIG. 22
LAPLACIAN CALCULATION
EXAMPLE: IN LOWER RIGHT DIRECTION
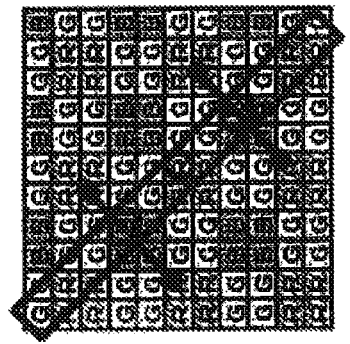
(a)
501 TARGET PIXEL
ENSURE NUMBER OF FIVE PIXELS OF SAME COLOR INCLUDING TARGET PIXEL IN EACH DIRECTION
(b)
(b1) L1
(b2) L2
(b3) L3
501 TARGET PIXEL
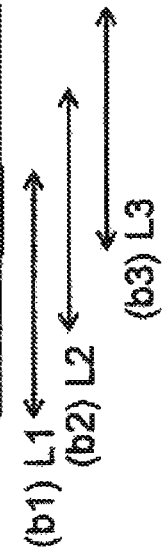
(c)
501 TARGET PIXEL
$$L_i = G_{i-1} + G_{i+1} - 2 \cdot G_i$$
L2
CALCULATE THREE TYPES OF LAPLACIANS INCLUDING TARGET PIXEL (L1, L2, L3)

DEFECT CORRECTION PROCESS

FIG. 26

VARIATION

4 DIVISION WRGB ARRAY

HIGHLIGHT ERROR CORRECTION DETERMINATION PROCESS
(ADJACENT AREA WHITE BALANCE CALCULATION PROCESS)

$$aveR = \frac{1}{N_R} \sum_{i=1}^{N_R} R_i$$

$$aveG = \frac{1}{N_G} \sum_{i=1}^{N_G} G_i$$

$$aveB = \frac{1}{N_B} \sum_{i=1}^{N_B} B_i$$

$$\text{WHITE BALANCE} = \frac{aveG}{aveR}, \frac{aveG}{aveB}$$

HIGHLIGHT ERROR CORRECTION DETERMINATION PROCESS

IMAGE PROCESSING APPARATUS, IMAGE PROCESSING METHOD, AND PROGRAM

CROSS REFERENCE TO PRIOR APPLICATION

This application is a continuation of U.S. patent application Ser. No. 13/593,697 (filed on Aug. 24, 2012), which claims priority to Japanese Patent Application Nos. 2012-070537 (filed on Mar. 27, 2012) and 2011-190053 (filed on Aug. 31, 2011), which are all hereby incorporated by reference in their entirety.

BACKGROUND

The present disclosure relates to an image processing apparatus, an image processing method, and a program, and more particularly, an image processing apparatus which performs an image correction process, an image processing method, and a program.

An image sensor used in an imaging apparatus such as a digital camera, for example, is provided with a color filter including an RGB array, and has a configuration in which light of a specific wavelength is incident on each pixel.

In detail, a color filter, for example, having a Bayer array is mainly used.

A captured image of the Bayer array is a so-called mosaic image in which only a pixel value corresponding to one color of RGB is set to each pixel of an image sensor. A signal processing unit of a camera performs a demosaicing process for setting all pixel values of RGB to each pixel by performing various types of signal processing such as pixel value interpolation with respect to the mosaic image, thereby generating and outputting a color image.

Signal processing for the captured image having a color filter according to the Bayer array has already been reviewed and has been technically established to a certain degree. However, signal processing for an image having an array different from the Bayer array has not been sufficiently reviewed.

In addition, for example, Japanese Unexamined Patent Application Publication No. 2011-55038 and the like have disclosed a correction process for a captured image of an imaging apparatus provided with a filter having an RGBW array including a full wavelength transmission white (W) pixel as well as each color of RGB as a filter belonging to an image sensor.

SUMMARY

In light of the foregoing, it is desirable to provide an image processing apparatus which performs an image correction process with respect to an image captured by an image sensor provided with a color filter having an array different from, for example, a Bayer array, an image processing method, and a program.

According to the first aspect of the present disclosure, there is provided an image processing apparatus including an image signal correction section configured to perform an image correction process. The image signal correction section performs a direction determination process of detecting a direction having a minimum pixel value gradient as a pixel value gradient direction in a pixel area including a target pixel, a defect detection process of calculating a Laplacian based on a pixel value of a reference pixel in a minimum gradient direction detected in the direction determination process with respect to the target pixel, and determining presence or absence of a defect of the target pixel, and a defect correction process of performing calculation of a corrected pixel value, which is obtained by applying the pixel value of the reference pixel in the direction detected in the direction determination process, with respect to a target pixel from which a defect has been detected in the defect detection process. The direction determination process is performed using a weighted addition result of a plurality of types of gradient information calculated through a plurality of different gradient detection processes.

Further, according to an embodiment of the present disclosure, the image signal correction section calculates pixel value gradient information corresponding to a high frequency texture, pixel value gradient information corresponding to a low frequency texture, and pixel value gradient information corresponding to a luminance signal in the direction determination process, and detects a direction having a minimum pixel value gradient based on a weighted addition result of the three types of gradient information.

Further, according to an embodiment of the present disclosure, the image signal correction section calculates the pixel value gradient information corresponding to the high frequency texture using a pixel value difference of adjacent pixels, and calculates the pixel value gradient information corresponding to the low frequency texture using a pixel value difference of non-adjacent pixels.

Further, according to an embodiment of the present disclosure, the image signal correction section calculates a luminance signal based on pixel values of RGB pixels in units of pixel areas including the RGB pixels, and calculates the pixel value gradient information corresponding to the luminance signal using the calculated luminance signal in units of areas.

Further, according to an embodiment of the present disclosure, the image signal correction section performs a process of changing a weight set in the weighted addition process of the three types of gradient information according to resolution of an output image, sets a weight of the pixel value gradient information corresponding to the high frequency texture to be higher than weights of other types of gradient information when the resolution of the output image is high, and sets a weight of the pixel value gradient information corresponding to the low frequency texture to be higher than weights of other types of gradient information when the resolution of the output image is low.

Further, according to an embodiment of the present disclosure, the image signal correction section performs a process of changing a weight set in the weighted addition process of the three types of gradient information according to a frequency band of an input image to be processed, sets a weight of the pixel value gradient information corresponding to the high frequency texture to be higher than weights of other types of gradient information when the input image includes many high frequency regions, and sets a weight of the pixel value gradient information corresponding to the low frequency texture to be higher than weights of other types of gradient information when the input image includes many low frequency regions.

Further, according to an embodiment of the present disclosure, the image signal correction section performs pixel value correction of an image in which RGB colors are arranged in 2×2 units of four pixels, or an image in which RGBW colors are arranged in 2×2 units of four pixels.

Further, according to an embodiment of the present disclosure, in the defect detection process, the image signal correction section selects a pixel with a color equal to a color of a target pixel, which is to be subject to defect detection, from the minimum gradient direction as a reference pixel, compares a plurality of Laplacians calculated based on different combinations of the target pixel and the selected pixel with a predetermined threshold value, and determines whether the target pixel is a defective pixel based on a result of the comparison.

Further, according to an embodiment of the present disclosure, the image signal correction section selects four pixels with a color equal to the color of the target pixel, which is to be subject to the defect detection, from the minimum gradient direction as reference pixels, compares three Laplacians calculated based on different combinations of the target pixel and the two selected pixels with a predetermined threshold value, and determines that the target pixel is a defective pixel when all three of the Laplacians are larger than the threshold value.

Further, according to an embodiment of the present disclosure, in the defect detection process, when only four pixels with a color equal to the color of the target pixel, which is to be subject to the defect detection, are unselectable from the minimum gradient direction in a predetermined reference area, the image signal correction section performs pixel interpolation on a position of a pixel with a color different from the color of the target pixel in the minimum gradient direction based on a pixel value of a pixel with a color equal to the color of the target pixel around the position of the pixel with the different color, and sets an interpolation pixel generated through the pixel interpolation as a reference pixel.

Further, according to an embodiment of the present disclosure, in the defect correction process, the image signal correction section calculates a corrected pixel value of the target pixel through weighted addition of a pixel value of the reference pixel.

Further, according to an embodiment of the present disclosure, in the defect detection process, the image signal correction section calculates a pixel value gradient between two reference pixels at both sides of the target pixel, and calculates a corrected pixel value of the target pixel through weighted addition of pixel values of two pixels in a direction in which the pixel value gradient is small.

Further, according to an embodiment of the present disclosure, the image signal correction section performs a highlight error correction determination process of determining whether or not the correction process performed in the defect detection process is highlight error correction, outputs an original pixel value before the correction when it is determined that the correction process is the highlight error correction, and outputs a corrected pixel value when it is determined that the correction process is not the highlight error correction.

Further, according to the second aspect of the present disclosure, there is provided an image processing method performed by an image processing apparatus, the method including performing, with an image signal correction section: a direction determination process of detecting a direction having a minimum pixel value gradient as a pixel value gradient direction in a pixel area including a target pixel, a defect detection process of calculating a Laplacian based on a pixel value of a reference pixel in a minimum gradient direction detected in the direction determination process with respect to the target pixel, and determining presence or absence of a defect of the target pixel, and a defect correction process of performing calculation of a corrected pixel value, which is obtained by applying the pixel value of the reference pixel in the direction detected in the direction determination process, with respect to a target pixel from which a defect has been detected in the defect detection process. The direction determination process is performed using a weighted addition result of a plurality of types of gradient information calculated through a plurality of different gradient detection processes.

Further, according to the third aspect of the present disclosure, there is provided a program for causing an image processing apparatus to perform image processing. The program causes an image signal correction section to perform a direction determination process of detecting a direction having a minimum pixel value gradient as a pixel value gradient direction in a pixel area including a target pixel, a defect detection process of calculating a Laplacian based on a pixel value of a reference pixel in a minimum gradient direction detected in the direction determination process with respect to the target pixel, and determining presence or absence of a defect of the target pixel, and a defect correction process of performing calculation of a corrected pixel value, which is obtained by applying the pixel value of the reference pixel in the direction detected in the direction determination process, with respect to a target pixel from which a defect has been detected in the defect detection process. The direction determination process is performed using a weighted addition result of a plurality of types of gradient information calculated through a plurality of different gradient detection processes.

Note that the program of the present disclosure is a program that can be provided to a computer that can execute various program codes, by means of a storage medium provided in a computer-readable format, a communication medium, for example, a storage medium such as an optical disc, a magnetic disk, or semiconductor memory, or a communication medium such as a network. When such a program is provided in a computer-readable format, a process in accordance with the program is implemented on the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

According to the configuration of an embodiment of the present disclosure, an apparatus and method capable of performing defect detection and correction with high accuracy with respect to an image having pixel arrays variously set are provided.

In detail, a plurality of different techniques are applied to a pixel area including a target pixel, so that various types of gradient detection information are acquired. Moreover, a minimum gradient direction is detected based on weighted addition of the gradient detection information. Moreover, a Laplacian is calculated based on a pixel value of a reference pixel with the same color as that of the target pixel in the detected minimum gradient direction and presence or absence of the defect of the target pixel is determined. Moreover, the pixel value of the reference pixel in a direction detected in a direction determination process is applied to a target pixel from which a defect has been detected, so that a corrected pixel value is calculated.

Through the present processes, the apparatus and method capable of performing defect detection and correction with high accuracy with respect to an image having pixel arrays variously set are realized.

BRIEF DESCRIPTION OF THE DRAWINGS

FIG. 6 is a diagram for explaining a direction determination process performed by an image processing apparatus of the present disclosure;

FIG. 7 is a diagram for explaining a direction determination process performed by an image processing apparatus of the present disclosure;

FIG. 8 is a diagram for explaining a gradient weighted average calculation process performed by an image processing apparatus of the present disclosure;

FIG. 9 is a diagram for explaining a weight determination processing example in a gradient weighted average calculation process performed by an image processing apparatus of the present disclosure;

FIG. 10 is a diagram for explaining a weight determination processing example in a gradient weighted average calculation process performed by an image processing apparatus of the present disclosure;

FIG. 16 is a diagram for explaining a direction determination process performed by an image processing apparatus of the present disclosure;

FIG. 18 is a diagram for explaining a pixel interpolation process performed by an image processing apparatus of the present disclosure;

FIG. 19 is a diagram for explaining a pixel interpolation process performed by an image processing apparatus of the present disclosure;

FIG. 21 is a diagram for explaining a pixel interpolation process performed by an image processing apparatus of the present disclosure;

FIG. 22 is a diagram for explaining a Laplacian calculation process performed by an image processing apparatus of the present disclosure;

FIG. 26 is a diagram for explaining a variation of a defect correction process performed by an image processing apparatus of the present disclosure;

DETAILED DESCRIPTION OF THE EMBODIMENTS

Figure 1:
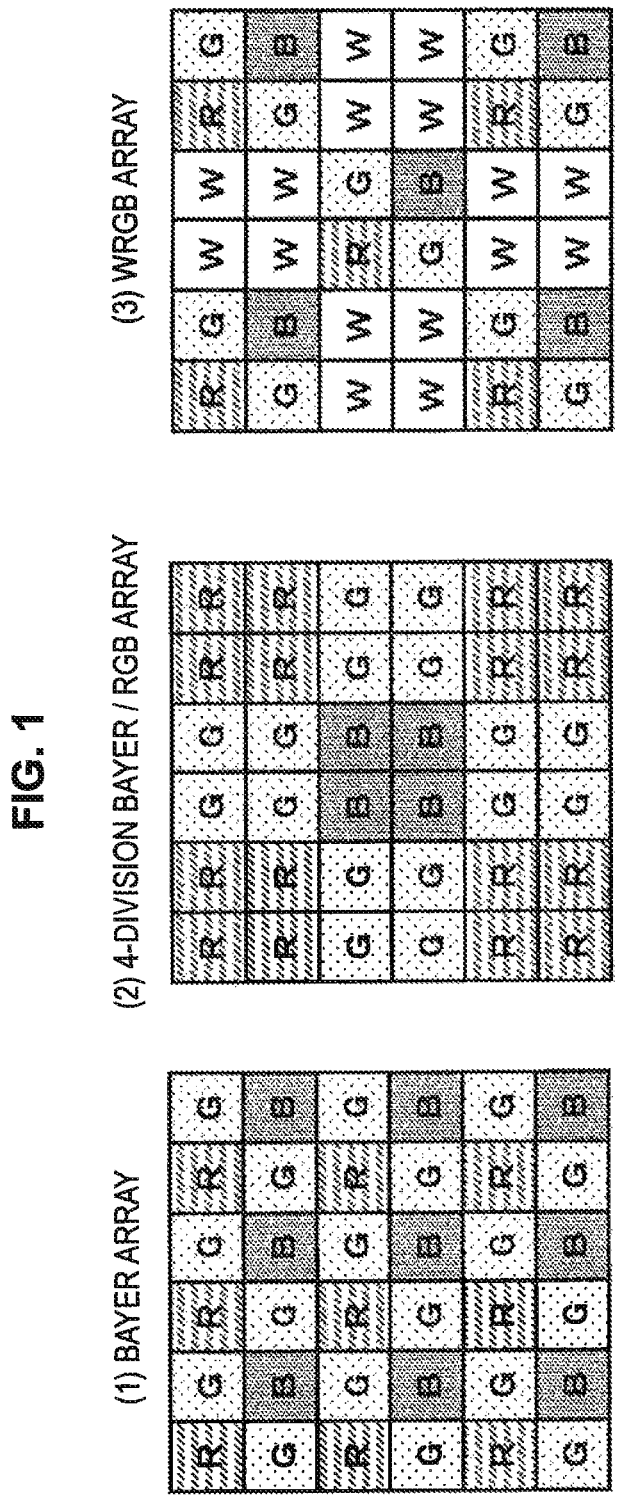
FIG. 1 is a diagram for explaining a configuration example of an image sensor.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image processing apparatus, an image processing method, and a program of the present disclosure will be described in detail with reference to the appended drawings. In addition, the description will be given in the following order.

1. Configuration Example of Image Sensor
2. Configuration Example of Image Processing Apparatus
3. Detailed Example of Image Processing
4. Direction Determination Process
5. Variation of Direction Determination Process
6. Defect Detection Process
7. Defect Correction Process
8. Variation of Defect Correction Process
9. Processing Example in which Highlight Error Correction Determination is Performed
10. Conclusion of Configuration of Present Disclosure

Configuration Example of Image Sensor

A configuration example of an image sensor will be described with reference to FIG. 1. FIG. 1 illustrates the following configuration examples of three image sensors.

(1) Bayer Array
(2) 4-Division Bayer RGB Array
(3) RGBW Array (1) The Bayer array has been employed in many cameras, and signal processing for a captured image including a color filter having the Bayer array has been approximately established.

However, for (2) the 4-division Bayer RGB array or (3) the RGBW array, signal processing for an image captured by an image sensor including such a filter has not been sufficiently reviewed.

In addition, (2) the 4-division Bayer RGB array corresponds to an array in which each of RGB pixels of the Bayer array illustrated in (1) is set as four pixels.

Hereinafter, an image processing apparatus for performing signal processing for an image captured by an image sensor including a color filter having (2) the 4-division Bayer RGB array will be described.

2. Configuration Example of Image Processing Apparatus

Figure 2:
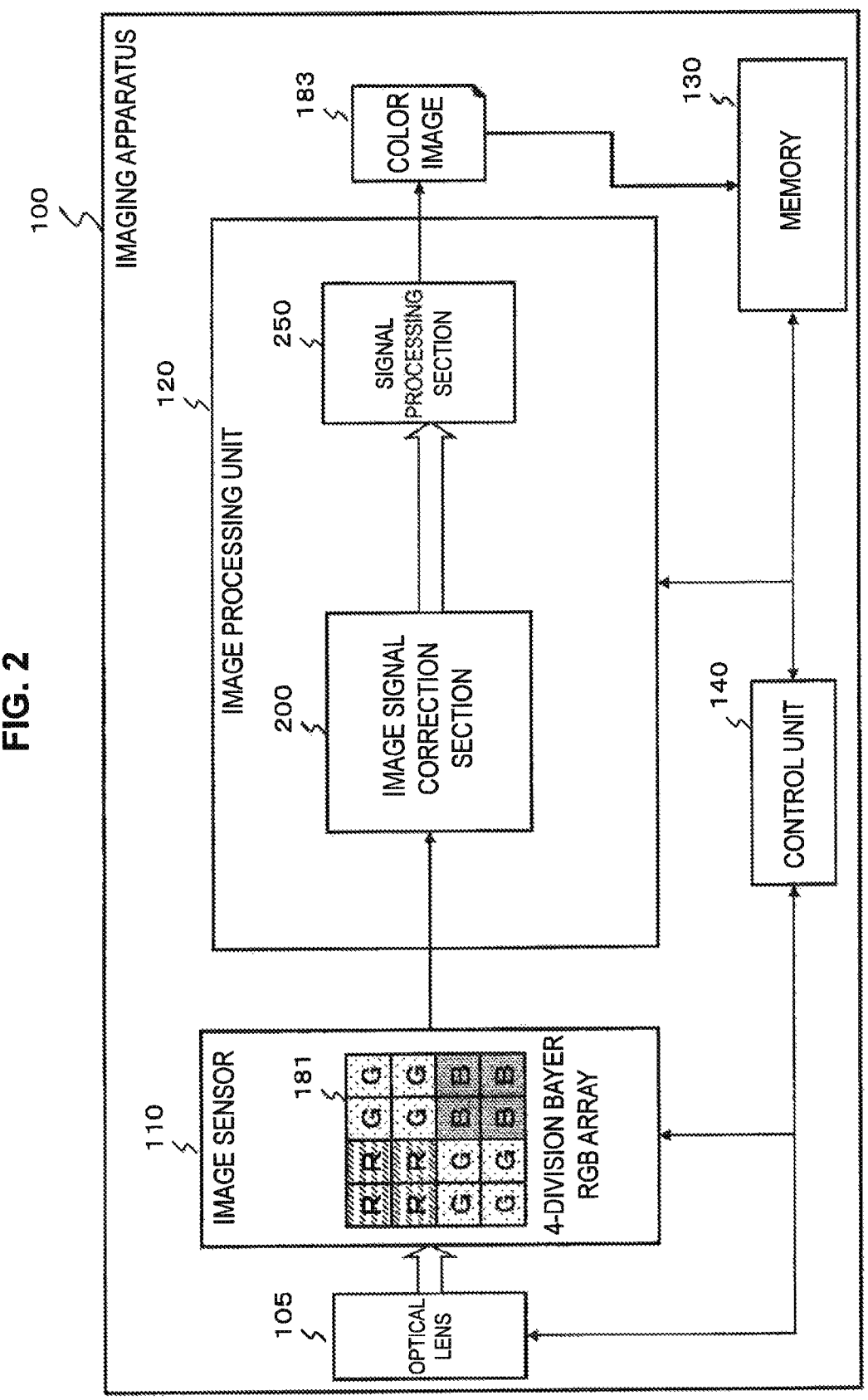
FIG. 2 is a diagram for explaining a configuration example of an image processing apparatus.

FIG. 2 illustrates a configuration example of an imaging apparatus 100 which is a configuration example of the image processing apparatus of the present disclosure.

As illustrated in FIG. 2, the imaging apparatus 100 includes an optical lens 105, an image sensor 110, an image processing unit 120, a memory 130, and a control unit 140.

In addition, the imaging apparatus 100 illustrated in FIG. 2 is an example of the image processing apparatus of the present disclosure, and the image processing apparatus of the present disclosure, for example, includes an apparatus such as a PC. An image processing apparatus such as a PC includes other elements, except for the optical lens 105 and the image sensor 110 of the imaging apparatus 100 illustrated in FIG. 2, and is provided with an input unit or a storage unit of data acquired by the image sensor 110.

Hereinafter, the imaging apparatus 100 illustrated in FIG. 2 will be described as a representative example of the image processing apparatus of the present disclosure. In addition, the imaging apparatus 100 illustrated in FIG. 2, for example, includes a still camera, a video camera, and the like.

The image sensor 110 of the imaging apparatus 100 illustrated in FIG. 2 includes a color filter having the 4-division Bayer RGB array described with reference to (2) of FIG. 1:

Red (R) that transmits a wavelength around a red color;
Green (G) that transmits a wavelengths around a green color; and
Blue (B) that transmits a wavelengths around a blue color.

The image sensor 110 includes color filters having these three types of spectral characteristics.

As described above, the 4-division Bayer RGB array corresponds to an array in which one pixel of the Bayer array illustrated in (1) of FIG. 1 is set as four pixels.

The image sensor 110 having a 4-division Bayer RGB array 181 receives RGB light through the optical lens 105 in units of pixels, and generates an electrical signal corresponding to received signal intensity through photoelectric conversion and outputs the electrical signal. Through the image sensor 110, a mosaic image having three types of RGB spectra is obtained.

An output signal of the image sensor 110 is input to an image signal correction section 200 of the image processing unit 120.

The image signal correction section 200 performs a correction process of an image having the 4-division Bayer RGB array 181, for example, correction of a defective image.

An image corrected by the image signal correction section 200 is input to a signal processing section 250. The signal processing section 250 performs the same process as that of a signal processing section in an existing camera, for example, white balance (WB) adjustment, a demosaicing process for setting pixel values of RGB to pixels, and the like, thereby generating and outputting a color image 183. The color image 183 is stored in the memory 130.

In addition, a control signal is input to the optical lens 105, the image sensor 110, and the image processing unit 120 from the control unit 140, so that photographing processing and signal processing are controlled. The control unit 140, for example, performs various processes according to a program stored in the memory 130, in addition to image photographing according to user input from an input unit (not illustrated).

3. Detailed Example of Image Processing

Next, processes performed by the image signal correction section 200 of the image processing unit 120 of FIG. 2 will be described with reference to FIG. 3 and subsequent figures.

FIG. 3a is the whole sequence of signal processing performed by the image signal correction section 200.

In step S101, the image signal correction section 200 selects one pixel (a target pixel) to be processed from a captured image input from the image sensor 110, and performs direction determination of a pixel value gradient with reference to a pixel area (for example, N×N pixels) around the target pixel.

That is, the image signal correction section 200 generates a direction in which the pixel value gradient is minimal as a direction determination result.

The direction in which the pixel value gradient is minimal corresponds to the edge direction, and is the direction in which a change in the pixel value is small. Meanwhile, the direction perpendicular to the edge direction has a large pixel value gradient and is the direction in which a change in the pixel value is large.

Figure 3:
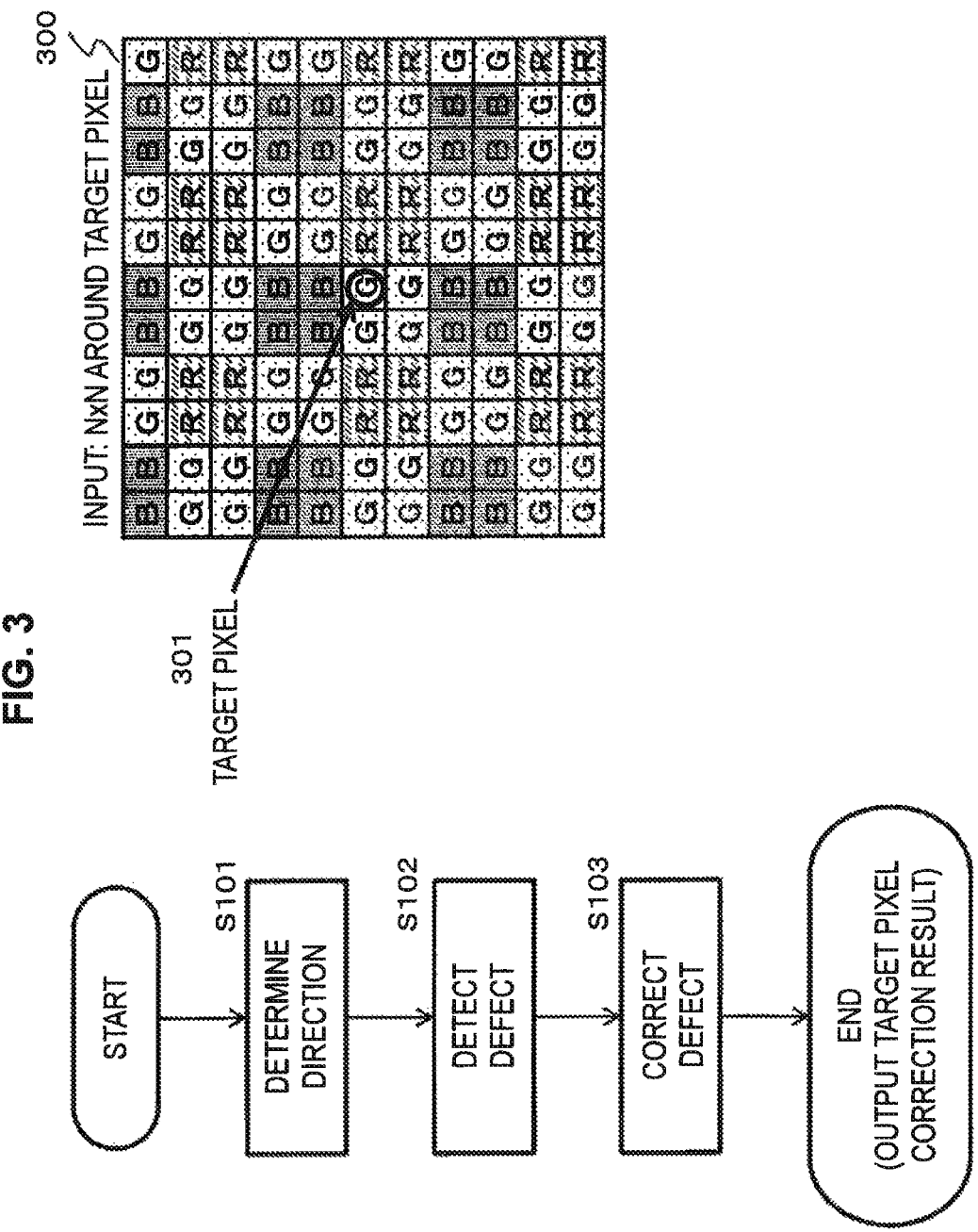
FIG. 3 is a flowchart for explaining a process performed by an image processing apparatus of the present disclosure.

For example, when performing a process for the target pixel, the image signal correction section 200 performs the process with reference to a pixel area 300 of N×N pixels about a target pixel 301 as illustrated in FIG. 3. In an example illustrated in FIG. 3, N is 11.

Subsequently, in step S102, the image signal correction section 200 determines whether the target pixel is a defective pixel, and performs defect correction in step S103 when the target pixel has a defect.

Hereinafter, these processes will be sequentially described in detail.

4. Direction Determination Process

First, the direction determination process of the pixel value gradient in step S101 of the flowchart of FIG. 3 will be described.

Figure 4:
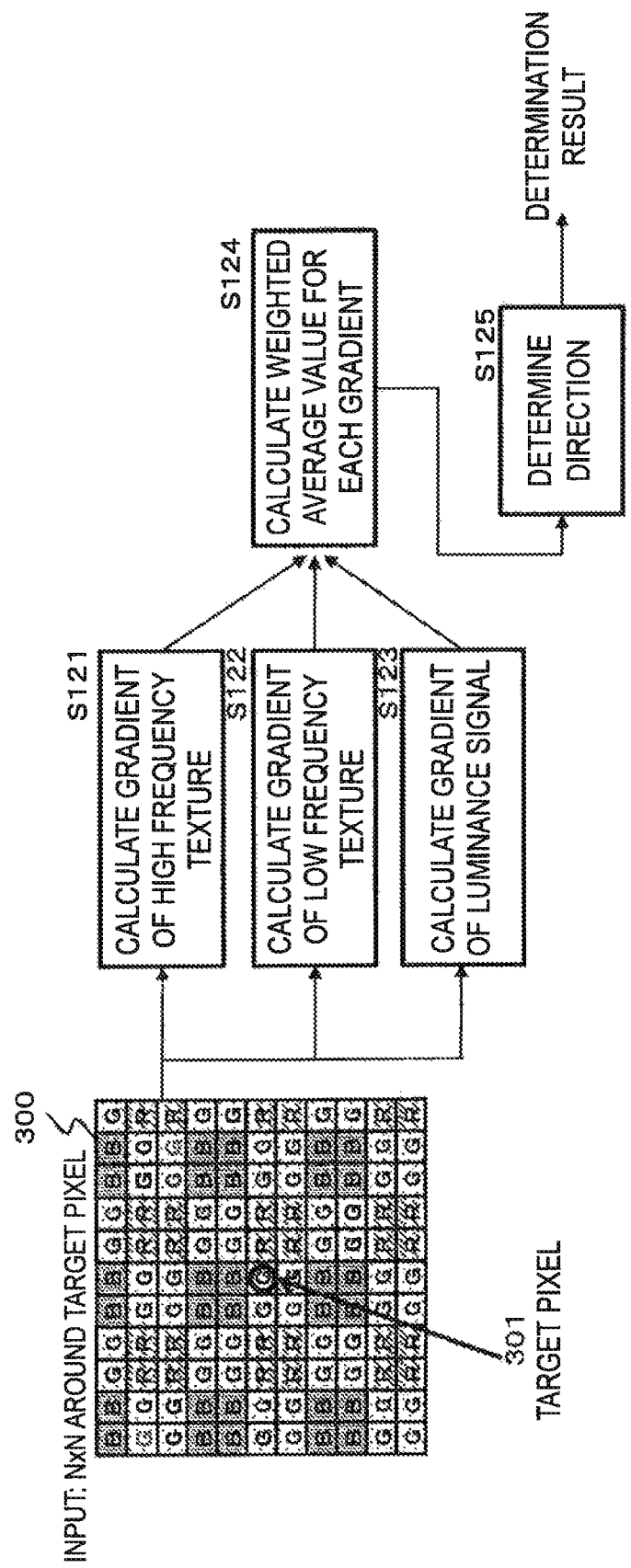
FIG. 4 is a flowchart for explaining a process performed by an image processing apparatus of the present disclosure.

FIG. 4 illustrates a detailed flowchart of the direction determination process.

As illustrated in FIG. 4, according to the direction determination process, the image signal correction section 200 employs the pixel area 300 of N×N pixels about the target pixel 301 as input, and sequentially outputs direction determination results of the pixel value gradient corresponding to the target pixel 301.

In detail, first, the image signal correction section 200 calculates a gradient of a high frequency texture in step S121, calculates a gradient of a low frequency texture in step S122, and calculates a gradient of a luminance signal in step S123, that is, performs three types of gradient calculation.

Moreover, the image signal correction section 200 calculates a weighted average value for the three gradient calculation results in step S124, and outputs the direction determination results based on the weighted average value in step S125.

Hereinafter, a detailed example of these processes will be described.

Figure 5:
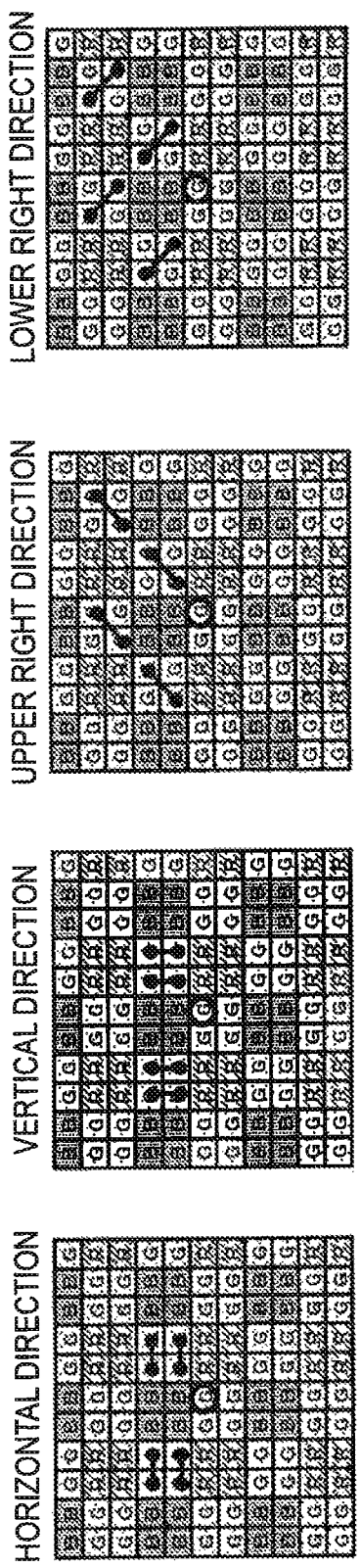
FIG. 5 is a diagram for explaining a direction determination process performed by an image processing apparatus of the present disclosure.

FIG. 5 is a diagram illustrating an example of the gradient calculation process of the high frequency texture in step S121.

In the pixel area 300 of N×N pixels about the target pixel 301, the image signal correction section 200 calculates the following gradients of each direction using a pixel value of a G pixel adjacent to or around the target pixel 301 as illustrated in FIG. 5:

A gradient in a horizontal direction: gradH;
A gradient in a vertical direction: gradV;
A gradient in an upper right direction: gradA; and
A gradient in a lower right direction: gradD.

In detail, the image signal correction section 200 calculates the gradient of the high frequency texture according to Equation 1 below.

$$gradH = \frac{1}{N_H} \sum_x \sum_y |G_{x,y} - G_{x+1,y}|$$

$$gradV = \frac{1}{N_V} \sum_x \sum_y |G_{x,y} - G_{x,y+1}|$$

$$gradA = \frac{1}{N_A} \sum_x \sum_y |G_{x,y} - G_{x+1,y-1}|$$

$$gradD = \frac{1}{N_D} \sum_x \sum_y |G_{x,y} - G_{x+1,y+1}|$$

Equation 1

In addition, $G_{x,y}$ a G pixel value of a coordinate position (x, y).

N denotes the number of gradients in each direction.

FIG. 6 is a diagram illustrating an example of the gradient calculation process of the low frequency texture in step S122.

In the pixel area 300 of N×N pixels about the target pixel 301, the image signal correction section 200 calculates the following gradients of each direction using the pixel value of the G pixel adjacent to or around the target pixel 301 as illustrated in FIG. 6:

A gradient in the horizontal direction: gradH;
A gradient in the vertical direction: gradV;
A gradient in the upper right direction: gradA; and
A gradient in the lower right direction: gradD.

In detail, the image signal correction section 200 calculates the gradient of the low frequency texture according to Equation 2 below.

$$gradH = \frac{1}{N_H} \sum_x \sum_y |G_{x,y} - G_{x+4,y}|$$

$$gradV = \frac{1}{N_V} \sum_x \sum_y |G_{x,y} - G_{x,y+4}|$$

$$gradA = \frac{1}{N_A} \sum_x \sum_y |G_{x,y} - G_{x+2,y-2}|$$

$$gradD = \frac{1}{N_D} \sum_x \sum_y |G_{x,y} - G_{x+2,y+2}|$$

Equation 2

In addition, $G_{x,y}$ denotes the G pixel value of the coordinate position (x, y).

N denotes the number of gradients in each direction.

FIG. 7 is a diagram illustrating an example of the gradient calculation process of the luminance signal in step S123.

In the pixel area 300 of N×N pixels about the target pixel 301, the image signal correction section 200 calculates a luminance signal by adding and averaging four RGGB pixels in units of 2×2 pixel areas as illustrated in FIG. 7:

luminance=(R+G+G+B)/4

Next, the image signal correction section 200 calculates the following gradients of each direction using the added average value:

A gradient in the horizontal direction: gradH;
A gradient in the vertical direction: gradV;
A gradient in the upper right direction: gradA; and
A gradient in the lower right direction: gradD.

In detail, the image signal correction section 200 calculates the gradient of the low frequency texture according to Equation 3 below.

$$gradH = \frac{1}{N_H} \sum_x \sum_y |L_{x,y} - L_{x+1,y}|$$

$$gradV = \frac{1}{N_V} \sum_x \sum_y |L_{x,y} - L_{x,y+1}|$$

$$gradA = \frac{1}{N_A} \sum_x \sum_y |L_{x,y} - L_{x+1,y-1}|$$

$$gradD = \frac{1}{N_D} \sum_x \sum_y |L_{x,y} - L_{x+1,y+1}|$$

Equation 3

In addition, denotes luminance calculated by the luminance calculation Equation luminance=(R+G+G+B)/4.

N denotes the number of gradients in each direction.

Next, the process of step S124 will be described with reference to FIG. 8.

In step S124, the image signal correction section 200 calculates the weighted average value for the three gradient calculation results, that is, the gradient of the high frequency texture calculated in step S121, the gradient of the low frequency texture calculated in step S122, and the gradient of the luminance signal calculated in step S123.

An example illustrated in FIG. 8 illustrates a calculation process example of the weighted average value gH of the gradient in the horizontal direction.

Given weights are added to the gradients obtained by the three types of methods, so that the weighted average is obtained.

The image signal correction section 200 multiplies the gradient $gradH_h$ of the high frequency texture calculated in step S121, the gradient $gradH_l$ of the low frequency texture calculated in step S122, and the gradient $gradH_i$ of the luminance signal calculated in step S123 by weights $w_h$, $w_l$, and $w_i$, respectively, adds the products to one another, and calculates the sum as the weighted average value gH.

That is, the image signal correction section 200 calculates the weighted average value gH of the gradient according to the equation gH=$w_h$×$gradH_h$+$w_l$×$gradH_l$+$w_i$×$gradH_i$.

In addition, the example illustrated in FIG. 8 illustrates a calculation process example of the weighted average value gH of the gradient in the horizontal direction. However, the image signal correction section 200 calculates the weighted average values gV, gA, and gD of the gradients in each direction similarly to the vertical direction, the upper right direction, and the lower right direction.

In addition, the weights $w_h$, $w_l$, and $w_i$ are weights for the following gradients, respectively.

The weight $w_h$ is a weight for the gradient of the high frequency texture calculated in step S121, the weight $w_l$ is a weight for the gradient of the low frequency texture calculated in step S122, and the weight $w_i$ is a weight for the gradient of the luminance signal calculated in step S123.

The weight may be applied as a preset value, for example, a fixed value such as a weight of 1:1:1. However, the weight may be set as a weight corresponding to image characteristics.

An example of weight setting corresponding to the image characteristics will be described with reference to FIG. 9 to FIG. 11.

First, a weight setting example corresponding to the resolution of an output image will be described with reference to FIG. 9.

FIG. 9 illustrates weight setting examples corresponding to the following two resolutions:

(a) a weight setting example when the output image has a full resolution; and (b) a weight setting example when the output image has a half resolution.

The full resolution corresponds to the case in which an image corresponding to the resolution of an image sensor, that is, the pixel configuration of the image sensor, is output.

The half resolution is a resolution of an image obtained by performing addition average for four pixel values of four pixel blocks with the same color of the image sensor to set one pixel value, and setting the total pixel value as ¼, wherein, in the image, the number of pixels at each of the vertical axis and the horizontal axis is set as ½.

(a) The weight when the output image has the full resolution, for example, is set as follows:

The weight for the gradient of the high frequency texture; wh=0.6;

The weight for the gradient of the low frequency texture: wl=0.1; and

The weight for the gradient of the luminance signal: wi=0.3.

Meanwhile, (b) the weight when the output image has the half resolution, for example, is set as follows:

The weight for the gradient of the high frequency texture: wh=0.1;

The weight for the gradient of the low frequency texture: wl=0.6; and

The weight for the gradient of the luminance signal: wi=0.3.

As described above, in the case of the full resolution, the weight of the high frequency gradient may be set to be larger than other weights.

Meanwhile, when an output resolution is allowed to be reduced, the ratio of the weight of the low frequency gradient is increased.

The weight setting is performed as described above, so that the gradient direction determination suitable for the output image is realized.

Next, a processing example, in which a weight is set corresponding to a frequency band of an input image to be processed, will be described with reference to FIG. 10.

In an example to be described below, for example, the weight of the high frequency gradient is set to be larger than other weights with respect to an image with many textures, that is, an image with many high frequency regions, alternatively, an image area. Meanwhile, the weight of the low frequency gradient is set to be larger than other weights with respect to a planar image in which a change in a pixel value is small.

As a technique for determining whether an image is an image with many high frequency regions or many low frequency regions, various techniques maybe employed. However, in the following description, an example using a Fourier transform will be described as an example thereof.

FIG. 10 illustrates a detailed processing example as a processing sequence when performing a process of setting a weight corresponding to the frequency band of the input image.

First, a two-dimensional Fourier transform is performed on the input image in step S151.

The Fourier transform will be described with reference to FIG. 11.

If the Fourier transform is performed on the input image, a Fourier coefficient F of a two-dimensional array equal to an image array is calculated.

That is, if the Fourier transform is performed on a W×H image in which the number of pixels of the image is W at a horizontal axis and is H at a vertical axis, W×H Fourier coefficients F(u,v) corresponding to the number of W×H configuration pixels are calculated.

The Fourier coefficients F(u,v) are calculated according to an equation below.

$$F(u, v) = \sum_{x=0}^{W} \sum_{y=0}^{H} I(x, y) \cdot \exp^{-j\frac{2\pi}{N}ux} \exp^{-j\frac{2\pi}{N}vy}$$

Figure 11:
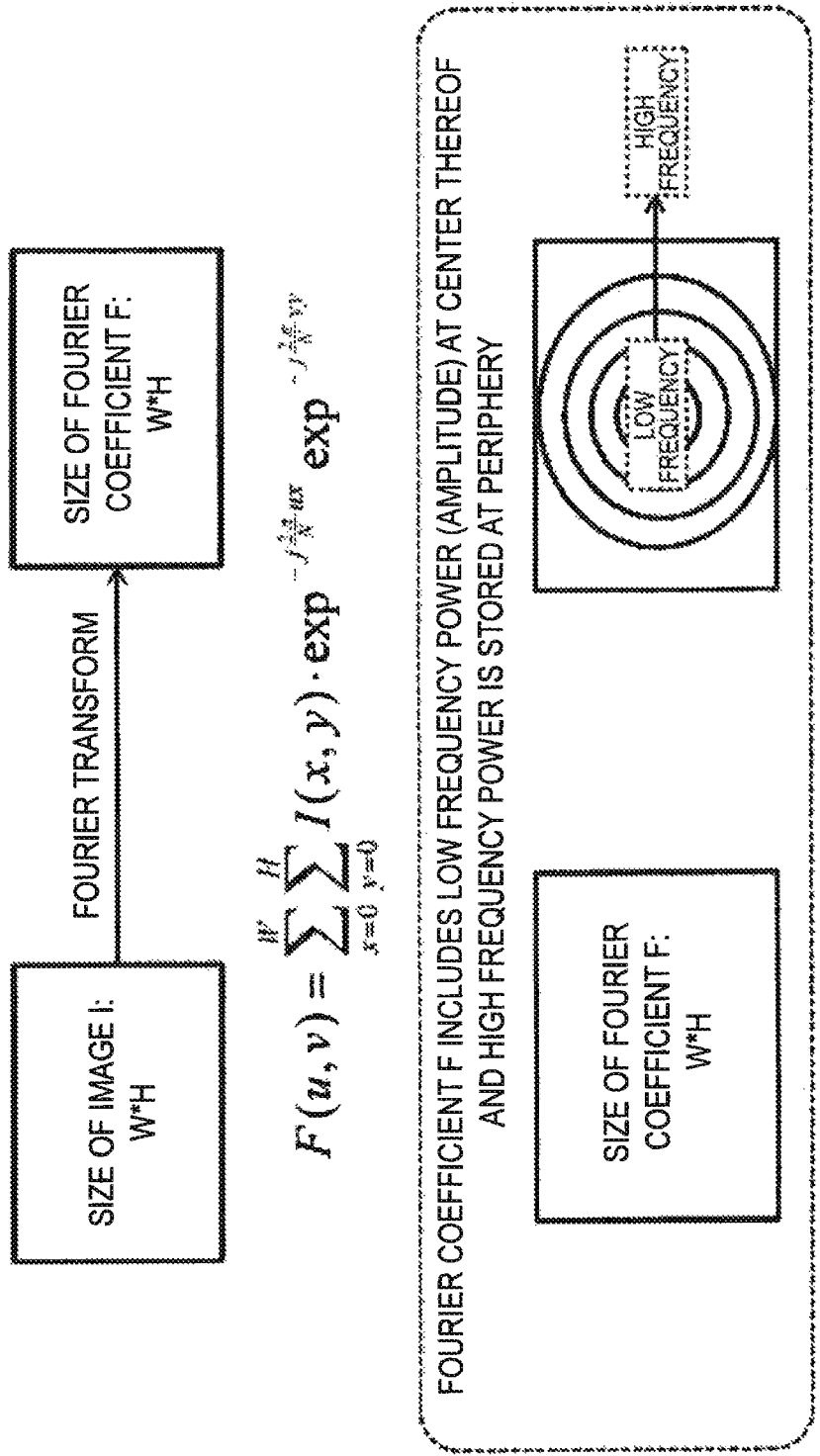
FIG. 11 is a diagram for explaining a weight determination processing example in a gradient weighted average calculation process performed by an image processing apparatus of the present disclosure.

The Fourier coefficients F(u,v) calculated according to the equation above include low frequency power (amplitude) at the center thereof as illustrated at the lower end of FIG. 11, and store high frequency power at a periphery thereof.

In step S151 illustrated in FIG. 10, the Fourier coefficients are calculated through the Fourier transform on the input image, that is, the output image of the image sensor. In addition, the Fourier coefficients are calculated up to a preset period N.

Next, in step S152 illustrated in FIG. 10, weights corresponding to the calculated Fourier coefficients are determined:

The weight for the gradient of the high frequency texture: wh;

The weight for the gradient of the low frequency texture: wl; and

The weight for the gradient of the luminance signal: wi.

As illustrated in (2) of FIG. 10, each weight is determined corresponding to the size of a frequency band from the calculated Fourier coefficients.

A coordinate axis of the Fourier coefficients F(u,v) is set as u,v as illustrated in (2) of FIG. 10 and then three rectangular areas are set in advance.

That is, (a) an outer area A in which u>T1 and v>T1, (b) an area B in which T1≥u>T2 and T1≥v>T2, and (c) a center area C in which T2≥u and T2≥v are set.

The area A is a high frequency area, the area C is a low frequency area, and the area B is an intermediate frequency area.

The Fourier coefficients F(u,v) calculated through the Fourier transform in step S151 are included in (a) to (c), respectively.

In step S152, for example, each weight is determined through the following setting.

The sum of the Fourier coefficients of the (high frequency) area A is set as the weight (wh) for the gradient of the high frequency texture, the sum of the Fourier coefficients of the (intermediate frequency) area B is set as the weight (wi) for the gradient of the luminance signal, and the sum of the Fourier coefficients of the (low frequency) area C is set as the weight (wl) for the gradient of the low frequency texture.

The above process is performed so that it is possible to set weights corresponding to the frequency bands of the image and to perform the gradient direction determination as an optimal process corresponding to the characteristics of the image. In addition, the process may be performed in units of images or predetermined areas of the image.

In step S124 illustrated in FIG. 4, a weighted average value is calculated for the three gradient calculated results, that is, the gradient of the high frequency texture calculated in step S121, the gradient of the low frequency texture calculated in step S122, and the gradient of the luminance signal calculated in step S123.

That is, the weighted average value gH of the gradients is calculated according to the equation $gH=w_h \times gradH_h + w_i \times gradH_l + w_l \times gradH_i$.

Next, the direction determination process in step S125 illustrated in FIG. 4 will be described.

In step S125, the following four values calculated in step S124 are compared with one another and a direction having a minimum value is obtained as a direction determination result:

A weighted average value gH of a horizontal gradient;
A weighted average value gV of a vertical gradient;
A weighted average value gA of a upper right gradient; and
A weighted average value gD of a lower right gradient.

As described above, the direction in which the pixel value gradient is minimal corresponds to the edge direction, and is the direction in which a change in the pixel value is small. Meanwhile, the direction perpendicular to the edge direction has a large pixel value gradient and is the direction in which a change in the pixel value is large.

For example, when a defective pixel (an error pixel) with an erroneously set pixel value is included in the image output from the image sensor and is corrected, a process is performed to calculate a corrected pixel value using a pixel value of a reference pixel selected from peripheral pixels.

When the reference pixel is selected, a pixel in the direction in which the pixel value gradient is minimal is selected, so that it is possible to perform pixel value correction more smoothly. This is for preventing non-smooth pixel value setting occurring when using a pixel value of a pixel in a direction in which a pixel value is suddenly changed.

The direction determination result obtained in step S125 is used for the above process.

In addition, a processing example using the direction determination result will be described later.

In the direction determination process of the present disclosure, weighted averaging is performed using a plurality of types of gradients. For example, combinations of a plurality of types of different gradients are used, so that it is possible to cope with textures of various frequencies.

Particularly, because a sampling interval of pixels of the same color is not a regular interval in the 4-division Bayer RGB array described as illustrated in (2) of FIG. 1, a frequency of a texture acquirable by a phase is biased.

In the configuration of the present disclosure, a high frequency texture and a low frequency texture are acquired and combined with each other, so that the direction determination process of pixel value gradients is performed. Using this technique, it is possible to perform direction determination with high accuracy.

Furthermore, using the luminance signal, it is possible to acquire a gradient from a signal sampled at a regular interval.

In the direction determination process of the present disclosure, the following three types of different gradients are calculated and combined with one another, thereby performing direction determination of pixel value gradients:

(a) Gradient of the high frequency texture;
(b) Gradient of the low frequency texture; and
(c) Gradient of the luminance signal.

Through this process, for example, direction determination with high accuracy is performed by preventing the occurrence of erroneous direction determination of pixel value gradients due to unevenness and the like of a pixel array.

In addition, in the related art, a technique of determining a texture direction of an image and performing defect detection and correction using a pixel signal along a determined direction has been proposed, and in order to determine the texture direction, a technique using a luminance signal and a technique using pixels, such as G pixels of the Bayer array, which are most densely arranged in a checked pattern, have been known. The latter technique is widely used because it enables the determination of a high frequency texture direction.

However, in the 4-division Bayer RGB array described as illustrated in (2) of FIG. 1, since the G pixels are not arranged in a checked pattern, a frequency of an acquirable texture is biased as compared with the Bayer array. Therefore, even in the case of the same textures, the accuracy of direction determination may be reduced, for example, a direction determination result may be changed according to an image position. Furthermore, since the gradient is calculated using pixels sampled at a constant interval, a texture direction of a specific frequency may not be successfully determined.

According to the aforementioned technique of the present disclosure, it is possible to solve these problems and perform direction determination with high accuracy.

5. Variation of Direction Determination Process

Next, a variation of the direction determination process will be described.

First Variation of Direction Determination Process

Figure 12:
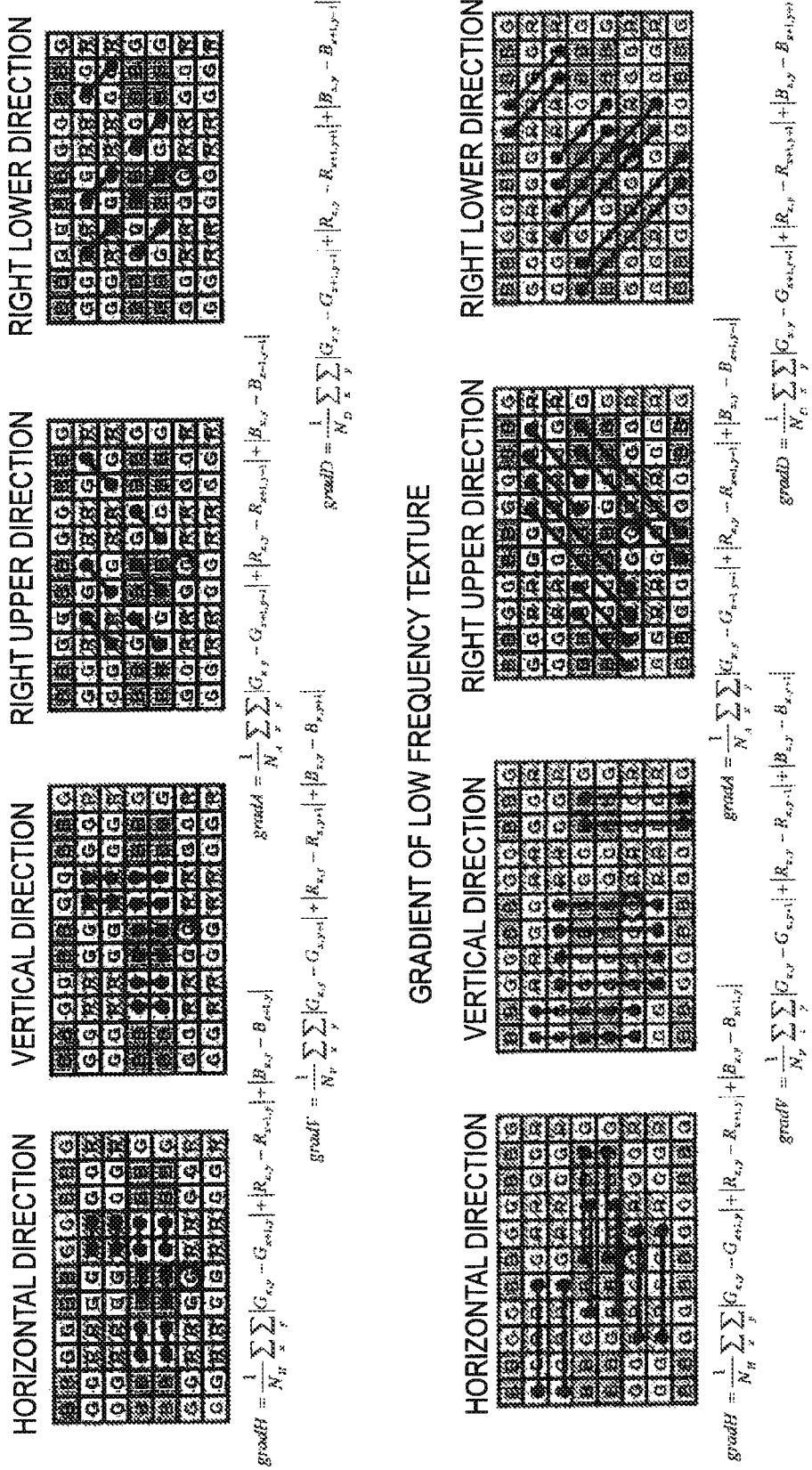
FIG. 12 is a diagram for explaining a gradient calculation process performed by an image processing apparatus of the present disclosure.

FIG. 12 illustrates a processing example of the first variation of the direction determination process.

FIG. 12 illustrates a calculation processing example of a gradient of a high frequency texture and a gradient of a low frequency texture.

In the pixel area 300 of N×N pixels about a target pixel, the image signal correction section 200 calculates the following gradients of each direction using the pixel values of the G, R, and B pixels adjacent to or around the target pixel 301 as illustrated in FIG. 12:

A gradient in the horizontal direction: gradH;
A gradient in the vertical direction: gradV;
A gradient in the upper right direction: gradA; and
A gradient in the lower right direction: gradD.

The present processing example is a processing example using the R pixel or the B pixel, in addition to the G pixel, when acquiring the gradient of the high frequency texture and the gradient of the low frequency texture.

In detail, the gradient of the high frequency texture is calculated according to Equation 4 below.

$$gradH = \frac{1}{N_H}\sum_x\sum_y |G_{x,y} - G_{x+1,y}| + |R_{x,y} - R_{x+1,y}| + |B_{x,y} - B_{x+1,y}|$$

$$gradV = \frac{1}{N_V}\sum_x\sum_y |G_{x,y} - G_{x,y+1}| + |R_{x,y} - R_{x,y+1}| + |B_{x,y} - B_{x,y+1}|$$

$$gradA = \frac{1}{N_A}\sum_x\sum_y |G_{x,y} - G_{x+1,y-1}| + |R_{x,y} - R_{x+1,y-1}| + |B_{x,y} - B_{x+1,y-1}|$$

$$gradD = \frac{1}{N_D}\sum_x\sum_y |G_{x,y} - G_{x+1,y+1}| + |R_{x,y} - R_{x+1,y+1}| + |B_{x,y} - B_{x+1,y+1}|$$

Equation 4

Furthermore, the gradient of the low frequency texture is calculated according to Equation 5 below.

$$gradH = \frac{1}{N_H}\sum_x\sum_y |G_{x,y} - G_{x+1,y}| + |R_{x,y} - R_{x+1,y}| + |B_{x,y} - B_{x+1,y}|$$

$$gradV = \frac{1}{N_V}\sum_x\sum_y |G_{x,y} - G_{x,y+1}| + |R_{x,y} - R_{x,y+1}| + |B_{x,y} - B_{x,y+1}|$$

$$gradA = \frac{1}{N_A}\sum_x\sum_y |G_{x,y} - G_{x+1,y-1}| + |R_{x,y} - R_{x+1,y-1}| + |B_{x,y} - B_{x+1,y-1}|$$

$$gradD = \frac{1}{N_D}\sum_x\sum_y |G_{x,y} - G_{x+1,y+1}| + |R_{x,y} - R_{x+1,y+1}| + |B_{x,y} - B_{x+1,y+1}|$$

Equation 5

Second Variation of Direction Determination Process

Figure 13:
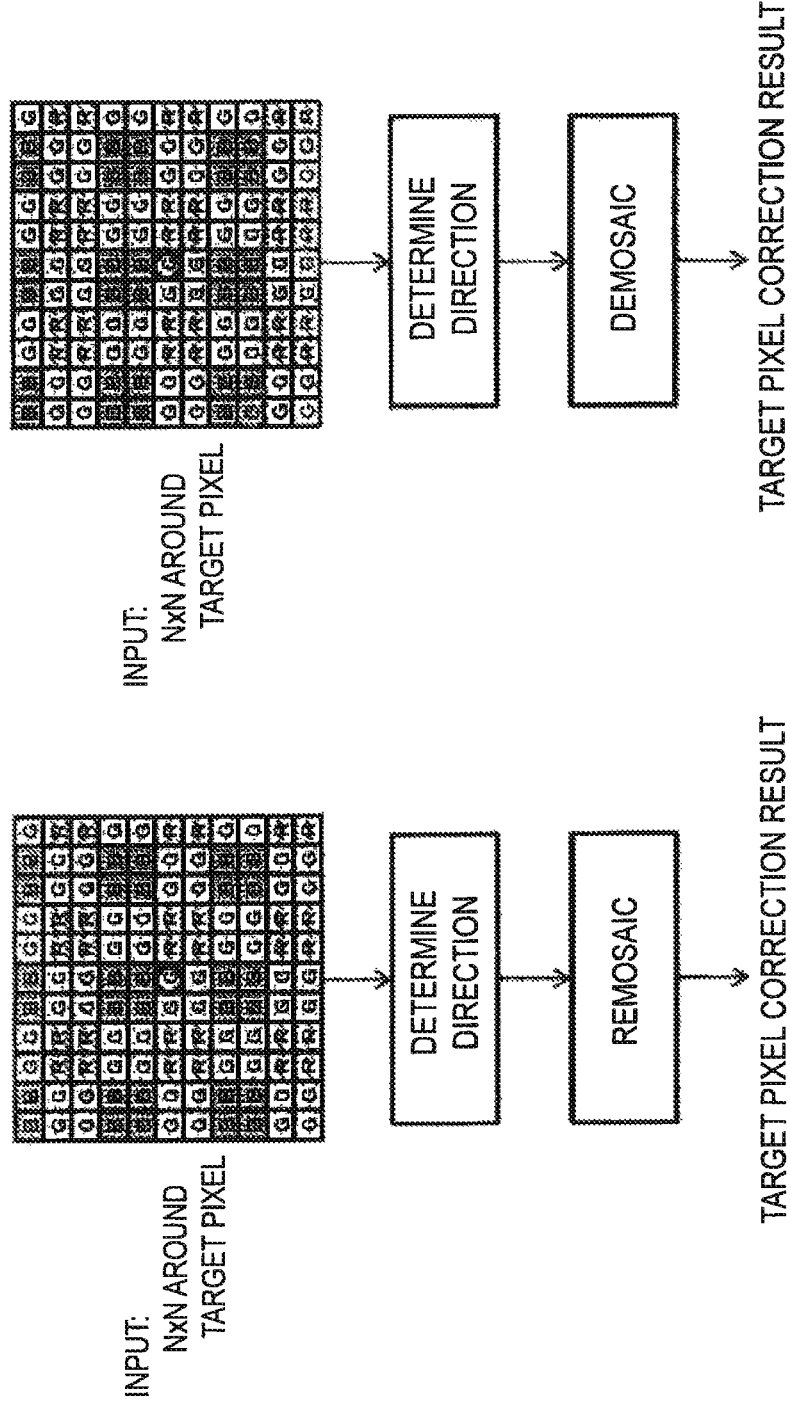
FIG. 13 is a diagram for explaining a gradient calculation process performed by an image processing apparatus of the present disclosure.

FIG. 13 illustrates a processing example of the second variation of the direction determination process.

FIG. 13 illustrates an example in which a direction determination result is used in a remosaicing process, and an example in which a direction determination result is used in a demosaicing process.

These direction determination results can be applied to various processes using the direction determination results as well as correction of a defective pixel.

In addition, the remosaicing process is a process of changing an RGB array set to each pixel output from the image sensor to generate different pixel arrays.

In detail, when the output from the image sensor, for example, is the 4-division Bayer RGB array described as illustrated in (2) of FIG. 1, the remosaicing process is a process of changing this array to the Bayer array illustrated in FIG. 1.

For example, generally, the signal processing section 250 in the image processing unit 120 of the imaging apparatus 100 illustrated in FIG. 2 performs signal processing for an image signal of the Bayer array illustrated in (1) of FIG. 1. Accordingly, when the output from the image sensor 110 is a pixel array different from the Bayer array, the remosaicing process of changing the pixel array to the Bayer array is performed and a processing result is input to the signal processing section 250, so that it is possible for the signal processing section 250 to have the same configuration as an existing general signal processing section.

The demosaicing process is a process of setting all RGB pixel values in all pixels. That is, in the configuration of FIG. 2, an image corresponding to the color image 183 is generated.

According to the remosaicing process and the demosaicing process, in order to set any one of RGB pixel values in a target pixel position (an interpolation pixel position), a pixel value interpolation process is performed to select a pixel with the same color as a color set in the interpolation pixel position from peripheral pixels as a reference pixel, and to determine a pixel value of the target pixel position using a pixel value of the selected reference pixel.

In the interpolation process, a direction having a small pixel value gradient is set as a selection direction of the reference pixel, so that it is possible to calculate an interpolation pixel value more smoothly.

In the embodiments according to the flowcharts illustrated in FIG. 13, the direction determination results of pixel value gradients are used as information for determining the direction of the reference pixel in the remosaicing process or the demosaicing process.

Third Variation of Direction Determination Process

Figure 14:
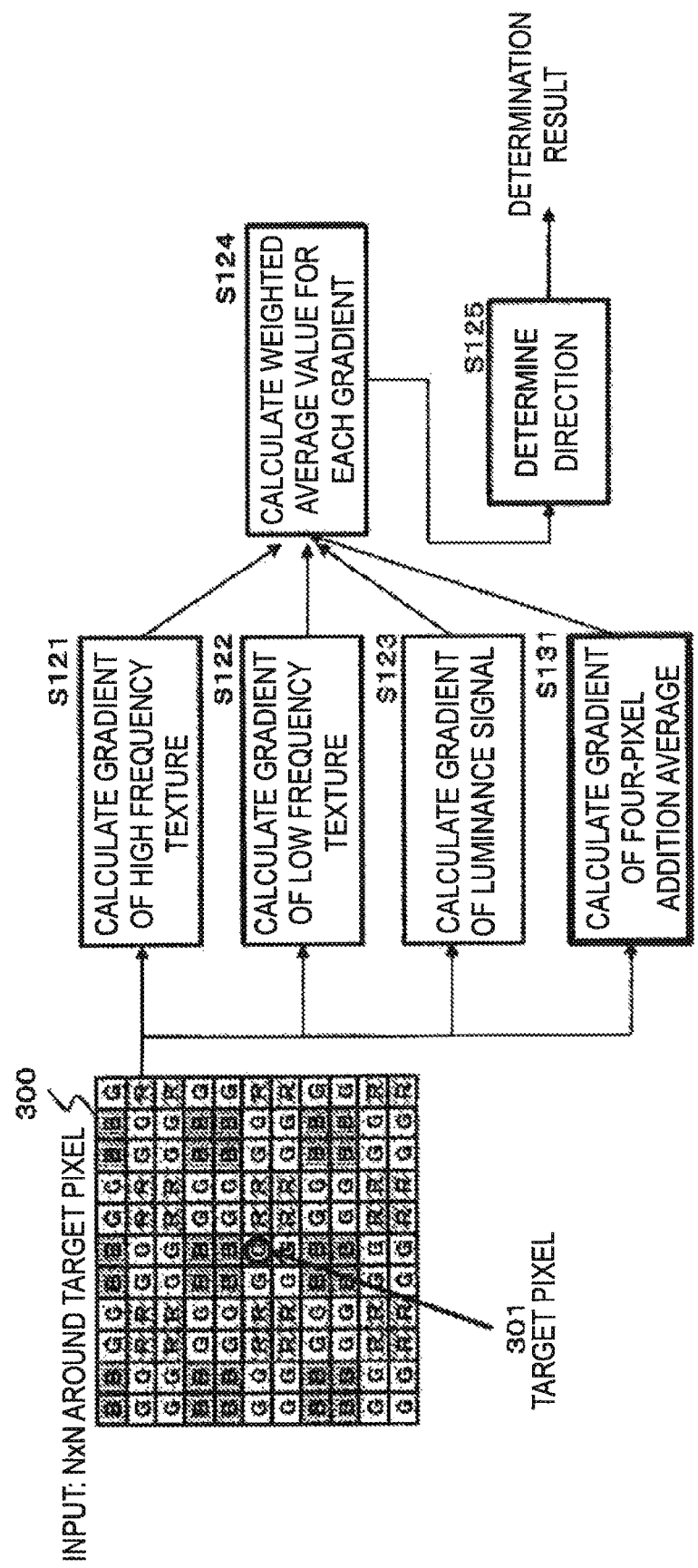
FIG. 14 is a diagram for explaining a gradient calculation process performed by an image processing apparatus of the present disclosure.

FIG. 14 illustrates a processing example of the third variation of the direction determination process.

According to an example illustrated in FIG. 14, in addition to step S121 to step S123 of the direction determination process described with reference to FIG. 4, a gradient calculation process of a four-pixel addition average is added as step S131.

Figure 15:
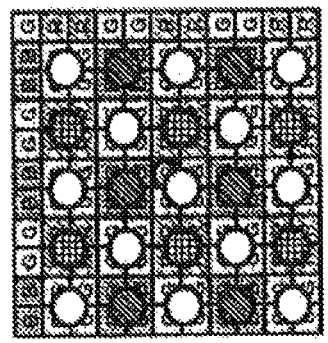
FIG. 15 is a diagram for explaining a gradient calculation process performed by an image processing apparatus of the present disclosure.

In detail, as illustrated in FIG. 15, added averages of pixel values are calculated in units of four pixel blocks of the same RGB color, and gradients are calculated from the added averages.

That is, one pixel having an added average value of pixel values of four pixels in units of four pixel blocks illustrated in FIG. 15, and gradients of horizontal, vertical, upper right, and lower right directions are calculated using an image in which the total number of pixels has been set to ¼ of pixels.

In addition, a calculation method of these gradients is equivalent to the gradient calculation process of the luminance signal described with reference to FIG. 7 in advance, and the gradients are calculated by setting a pixel value (the added average value of the four pixels) in Equation 3 above, instead of luminance.

In step S124 of FIG. 14, the image signal correction section 200 calculates the weighted average value for the four gradient calculation results, that is, the gradient of the high frequency texture calculated in step S121, the gradient of the low frequency texture calculated in step S122, the gradient of the luminance signal calculated in step S123, and the gradient of the four-pixel addition average calculated in step S131.

As described above, it is possible to obtain various types of setting such as an increase or decrease in the type of the gradients for which a calculation process of the weighted average value is to be performed.

Fourth Variation of Direction Determination Process

Figure 16:
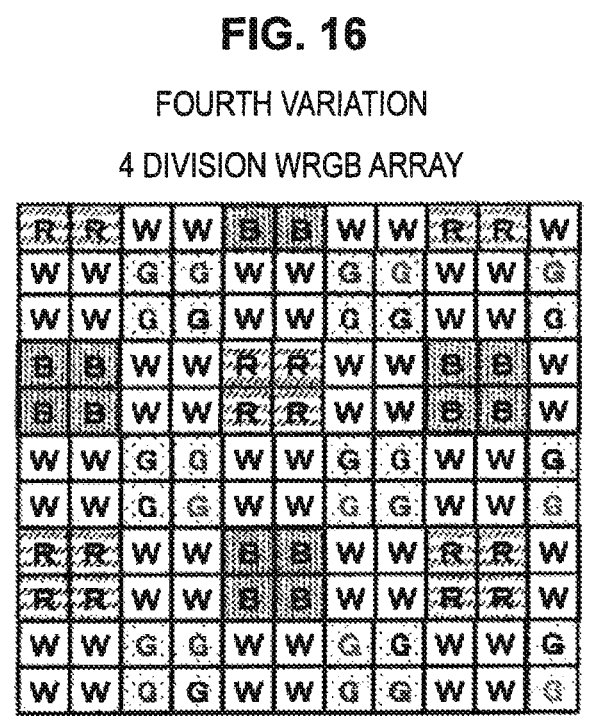

The aforementioned processing examples have been described for the 4-division Bayer RGB array described with reference to (2) of FIG. 1. However, the processes of the present disclosure can be applied to image data of other arrays, for example, various arrays such as the Bayer array illustrated in (1) of FIG. 1, the WRGB array illustrated in (3) of FIG. 1, or a 4-division WRGB array illustrated in FIG. 16.

6. Defect Detection Process

Next, the defect detection process in step S102 of the flowchart of FIG. 3 will be described.

The process of step S102 is for determining whether a target pixel is a defective pixel, and when a defect is included, defect correction is performed in step S103.

Figure 17:
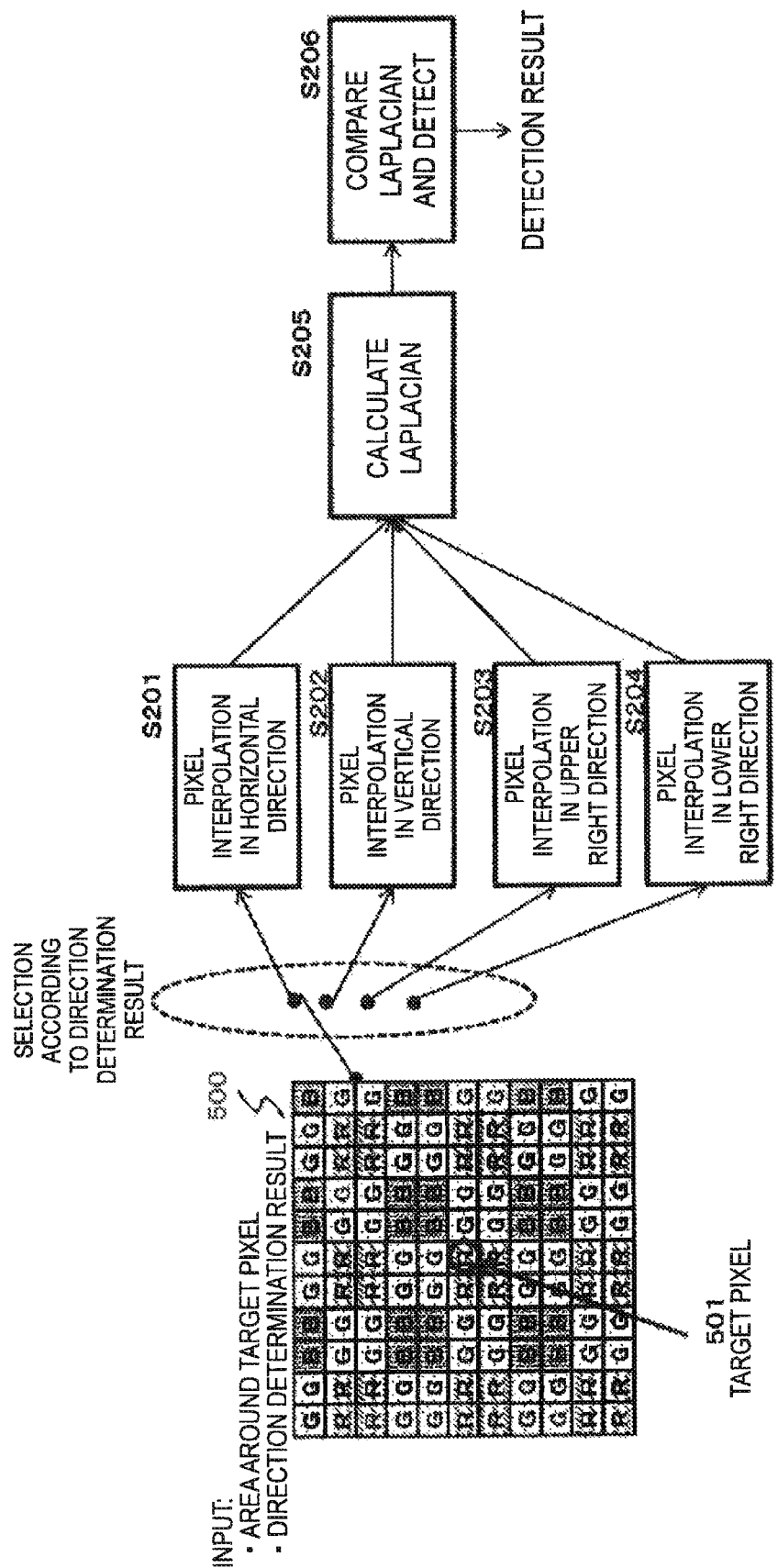
FIG. 17 is a diagram for explaining a defect detection process performed by an image processing apparatus of the present disclosure.

FIG. 17 illustrates a detailed flowchart of the defect detection process.

A pixel area 500 of N×N pixels about a target pixel 501 is employed as input, and direction information detected in step S101 of the flowchart of FIG. 3 is employed as input.

In the defect detection process, pixel interpolation in the horizontal direction of step S201, pixel interpolation in the vertical direction of step S202, pixel interpolation in the upper right direction of step S203, and pixel interpolation in the lower right direction of step S204 are selectively performed.

That is, the image signal correction section 200 selects a direction that corresponds to a direction in which the gradient obtained as the direction determination result in step S101 of the flowchart of FIG. 3 is minimal, and performs pixel interpolation.

For example, when the direction in which the gradient is minimal is the horizontal direction, the image signal correction section 200 performs the pixel interpolation in the horizontal direction of step S201.

A detailed example of the pixel interpolation process will be described with reference to FIG. 18.

FIG. 18 illustrates processing examples in which the target pixel is an R pixel.

FIG. 18 illustrates an interpolation processing example (corresponding to step S201) in the horizontal direction and an interpolation processing example (corresponding to step S204) in the lower right direction.

The image signal correction section 200 selects pixels of the same color from each direction and performs the interpolation process using the selected pixels as reference pixels.

However, as illustrated in FIG. 18, the number of reference pixels is changed according to directions.

In the interpolation processing example in the horizontal direction illustrated in FIG. 18, since the number of R pixels with the same color as an R pixel (a center target pixel) is six including the target pixel in the horizontal direction, these six pixels are acquirable as the reference pixels.

However, in the interpolation processing example in the lower right direction illustrated in FIG. 18, since the number of R pixels with the same color as an R pixel (a center target pixel) is three including the target pixel in the lower right direction, only these three pixels are available as the reference pixels.

The number of pixels which can be referred to is changed according to the reference directions. Particularly, when the target pixel is the R pixel or the B pixel, the number of reference pixels corresponding to the reference directions is significantly reduced.

As described above, when only reference pixels smaller than a preset threshold value are obtained in a certain reference direction, an interpolation process is performed to select pixels of the same color in a direction perpendicular to the reference direction, and to set an interpolation pixel value in the reference direction based on the pixel values of the selected pixels as illustrated in FIG. 19. This interpolation pixel is set as a reference pixel and the number of reference pixels is allowed to be increased, and then an interpolation process is performed as pixel value setting of the target pixel based on these reference pixels.

In an array in which a sampling interval is not constant as with the 4-division Bayer RGB array described with reference to (2) of FIG. 1, since the number of pixels is small according to directions, the number of reference pixels is increased through the above interpolation. Through this process, it is possible to increase the number of reference pixels, so that it is possible to calculate a corrected pixel value with high accuracy.

As described above, when the number of reference pixels is small in the reference direction, an interpolation pixel is set in the reference direction, so that it is possible to set the number of reference pixels with the same RGB color equal to one another in all directions Through this process, the corrected pixel value is set to the target pixel, so that it is possible to perform correction with high accuracy and to perform the same process with the same color in all directions. Consequently, it is possible to perform a process using the same correction circuit, resulting in a reduction of a circuit size provided in an apparatus.

The process described with reference to FIG. 19 is an interpolation processing example in which pixels of the same color in the direction perpendicular to the reference direction are selected, and the interpolation pixel value is set in the reference direction based on the pixel values of the selected pixels.

The process of setting the interpolation pixel value in the reference direction is not limited to the pixels in the direction perpendicular to the reference direction, and peripheral pixels with the same color in any given direction of the interpolation pixel position may be employed.

An example of this process will be described with reference to FIG. 20 and FIG. 21.

Figure 20:
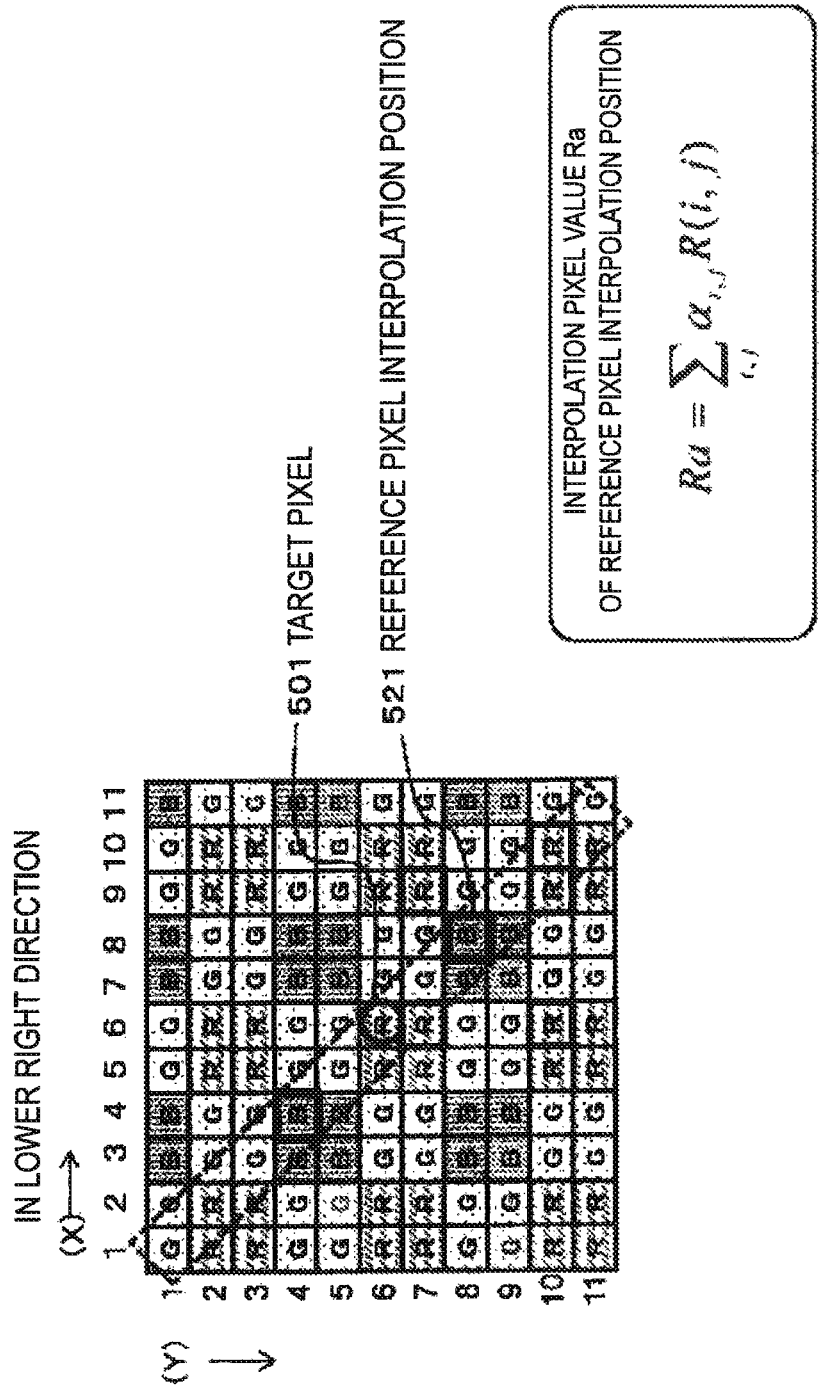
FIG. 20 is a diagram for explaining a pixel interpolation process performed by an image processing apparatus of the present disclosure.

Similarly to FIG. 19, FIG. 20 illustrates a processing example when the reference pixels are set in the lower right direction.

According to the processing example, a target pixel 501 is a center R pixel and R pixels are set as the reference pixels in the lower right direction.

A process when an R pixel is set at a reference pixel interpolation position 521 illustrated in FIG. 20 will be described.

In addition, FIG. 20 illustrates an image of (x,y)=(1,1) to (11,11) when a horizontal direction of the image is defined as X and a vertical direction is defined as Y.

The target pixel 501 is an R pixel at a coordinate position (x,y)=(6,6).

The reference pixel interpolation position 521 is a position of a B pixel of a coordinate position (8,8).

An R pixel is interpolated at the position of the B pixel at the coordinate position (8,8).

In the present example, pixels with the same color are selected in all directions as well as a vertical direction of the reference direction (a lower right direction in the present example). In detail, a preset number of pixels with the same color in a preset distance from the reference pixel interpolation position 521 are selected.

FIG. 20 illustrates a processing example in which five R pixels around the reference pixel interpolation position 521 are selected as pixels to be applied to interpolation pixel value calculation. Pixels surrounded by a thick line illustrated in FIG. 20 are R pixels. In detail, the R pixels are as follows:

(1) R pixel at a coordinate position (x,y)=(6,7);
(2) R pixel at a coordinate position (x,y)=(9,7);
(3) R pixel at a coordinate position (x,y)=(6,10);
(4) R pixel at a coordinate position (x,y)=(9,10); and
(5) R pixel at a coordinate position (x,y)=(10,10).

An addition average of the pixel values of these five R pixels is calculated and is set as an interpolation pixel value of the R pixel of the reference pixel interpolation position 521.

That is, an interpolation pixel value Ra of the R pixel of the reference pixel interpolation position 521 is calculated according to an equation below.

$$Ra = \sum_{i,j} \alpha_{i,j} R(i, j)$$

With reference to FIG. 21, a description will be provided for a detailed interpolation pixel value calculation processing example when the number of pixels to be applied to an interpolation process is set to three.

FIG. 21 illustrates a processing example in which three R pixels around the reference pixel interpolation position 521 are selected as pixels to be applied to interpolation pixel value calculation. Pixels surrounded by a thick line illustrated in FIG. 21 are R pixels. In detail, the R pixels are as follows:

(1) R pixel at a coordinate position (x,y)=(6,7);
(2) R pixel at a coordinate position (x,y)=(9,7); and
(3) R pixel at a coordinate position (x,y)=(9,10).

An addition average of the pixel values of these three R pixels is calculated and is set as an interpolation pixel value of the R pixel of the reference pixel interpolation position 521.

That is, an interpolation pixel value Ra of the R pixel of the reference pixel interpolation position 521 is calculated according to an equation below.

$$Ra = \sum_{i,j} \alpha_{i,j} R(i, j)$$
$$= \alpha \times R(7, 6) + \beta \times R(7, 9) + \gamma \times R(10, 9)$$

As described above, as the process of interpolating the reference pixels in the reference direction, the process of applying pixels with the same color as that of the target pixel in the direction perpendicular to the reference direction as described with reference to FIG. 19, or the process of applying pixels with the same color as that of the target pixel around the interpolation pixel position in the reference direction as described with reference to FIG. 20 and FIG. 21 can be applied.

Next, a Laplacian calculation process of step S205 of the flowchart of FIG. 17 will be described with reference to FIG. 22.

As illustrated in (a) of FIG. 22, five pixels of the same color including a target pixel 501 extracted in the aforementioned interpolation process are selected.

Moreover, these five pixels are arranged in a row in the sequence of pixel positions as illustrated in (b) of FIG. 22, so that the following three types of combination arrays of the pixels including the target pixel 501 are set:

(b1) Three-pixel array in which the target pixel 501 is set at a right end;
(b2) Three-pixel array in which the target pixel 501 is set at a center; and
(b3) Three-pixel array in which the target pixel 501 is set at a left end.

Based on the three three-pixel arrays (b1) to (b3), the following three types of Laplacians L1, L2, and L3 are calculated:

(L1) Laplacian L1 based on the three-pixel array (b1);
(L2) Laplacian L2 based on the three-pixel array (b2); and
(L3) Laplacian L3 based on the three-pixel array (b3).

In addition, the Laplacians are calculated according to Equation 6 below.

That is, when pixel positions of pixels of the three-pixel array are set as i−1, i, and i+1 from the left, and pixel values of the pixel positions are set as $G_{i-1}$, $G_i$, and $G_{i+1}$, Laplacian $L_i$ is calculated according to Equation 6 below.

$$L_i = G_{i-1} + G_{i+1} - 2G_i \quad \text{Equation 6}$$

Next, the Laplacian comparison and defect detection processes of step S206 of the flowchart of FIG. 17 will be described with reference to FIG. 23.

Figure 23:
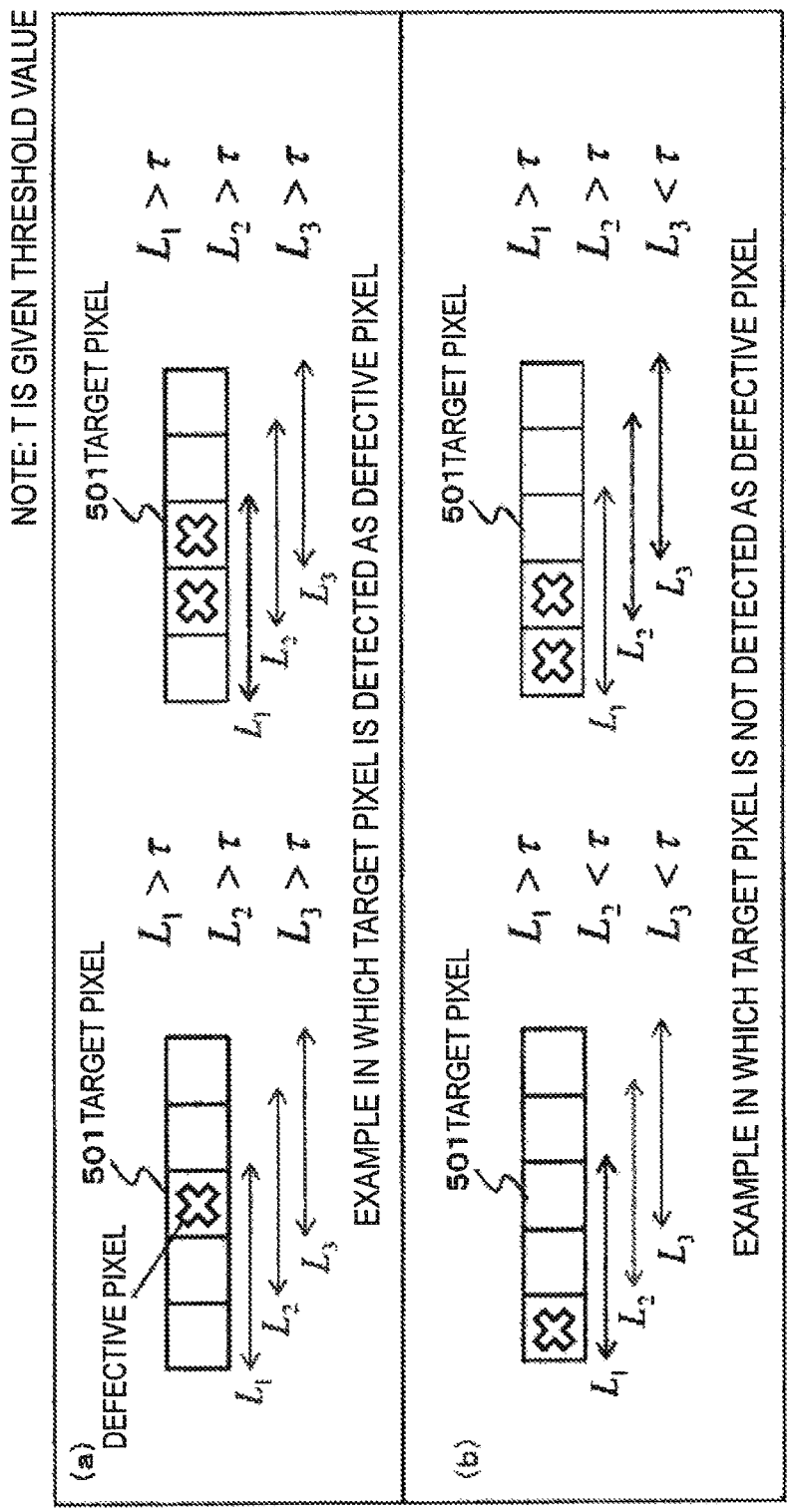
FIG. 23 is a diagram for explaining a Laplacian comparison process performed by an image processing apparatus of the present disclosure.

As illustrated in FIG. 23, defect detection is performed through a comparison of the Laplacians calculated in step S205.

In detail, when L1>τ, L2>τ, and L3>τ, it is determined that a target pixel is a defective pixel.

In addition, τ is a preset threshold value.

For example, in two examples illustrated in (a) of FIG. 23, when the conditions L1>τ, L2>τ, and L3>τ are satisfied, it is determined that a target pixel 501 is the defective pixel.

Meanwhile, in two examples illustrated in (b) of FIG. 23, when the conditions L1>τ, L2>τ, and L3>τ are not satisfied, it is determined that the target pixel 501 is not the defective pixel.

7. Defect Correction Process

Next, the defect correction process in step S103 of the flowchart of FIG. 3 will be described.

Details of the correction process will be described with reference to FIG. 24 and FIG. 25.

Figure 24:
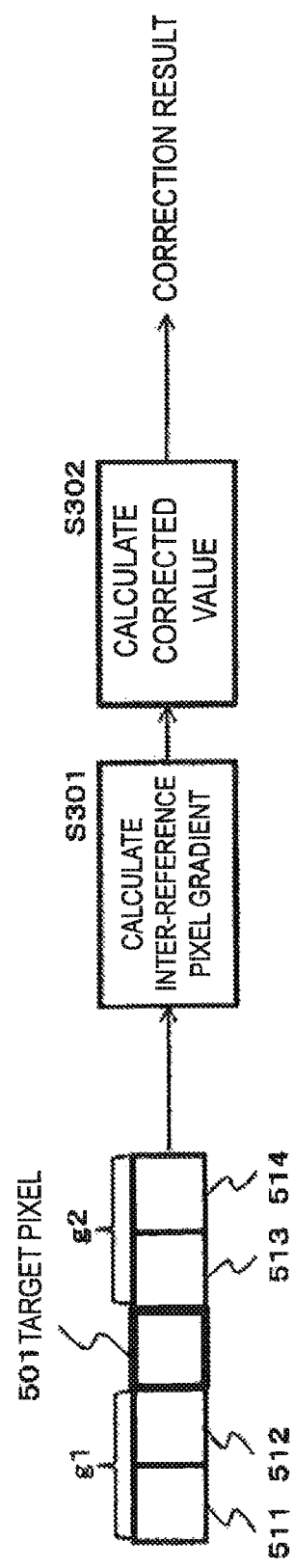
FIG. 24 is a diagram for explaining a defect correction process performed by an image processing apparatus of the present disclosure.

As illustrated in FIG. 24, five pixels of the same color including the target pixel 501 used for the defect detection is applied to the correction process. These five pixels are arranged in a direction in which a pixel value gradient is small in the direction determination process in step S101 of the flowchart of FIG. 3. That is, the five pixels include the target pixel described with reference to FIG. 18 to FIG. 22, and the reference pixels. A part thereof may include a pixel generated by the interpolation process described with reference to FIG. 19.

Using the five pixels, which include the target pixel 501 and are arranged in the direction in which the pixel value gradient is small as illustrated in FIG. 24, inter-reference pixel gradients are calculated in step S301.

The inter-reference pixel gradient is a pixel value gradient between two pixels at both sides of the target pixel 501.

A pixel value gradient g1 between a reference pixel 511 and a reference pixel 512 and a pixel value gradient g2 between a reference pixel 513 and a reference pixel 514 illustrated in FIG. 24 are calculated.

In step S302, a corrected value, that is, a corrected pixel value of the target pixel 501, is calculated using the inter-reference pixel gradient.

Figure 25:
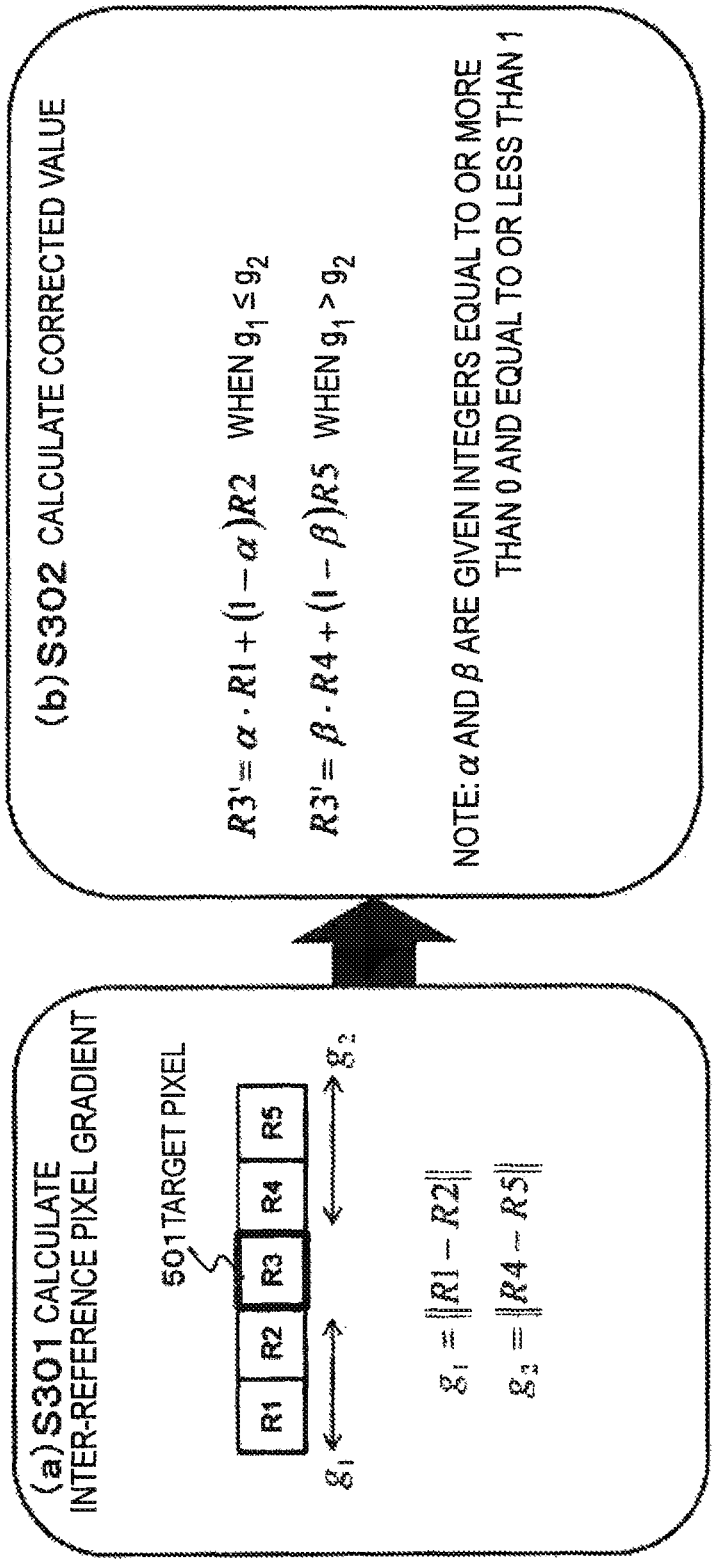
FIG. 25 is a diagram for explaining a defect correction process performed by an image processing apparatus of the present disclosure.

With reference to FIG. 25, the inter-reference pixel gradient calculation process of step S301 and the corrected pixel value calculation process of step S302 will be described in detail.

As illustrated in (a) of FIG. 25, in the inter-reference pixel gradient calculation process of step S301, two inter-reference pixel gradients at both sides of a target pixel are calculated.

An example illustrated in (a) of FIG. 25 is a processing example of R pixels. R1 to R5 indicate pixel values of the pixels.

In the inter-reference pixel gradient calculation process of step S301, the gradients are calculated according to the following equations:

$g1=|R1-R2|$; and $g2=|R4-R5|$.

In step S301, these two inter-reference pixel gradients are calculated.

Next, the process of step S302, that is, the corrected pixel value calculation process, will be described with reference to (b) of FIG. 25.

The corrected pixel value is set as R3'.

The corrected pixel value R3' is calculated according to the following equations:

$R3'=\alpha \times R1+(1-\alpha)\times R2$ when $g1 \leq g2$; and $R3'=\beta \times R4+(1-\beta)\times R5$ when $g1 > g2$.

In Equations above, $\alpha$ and $\beta$ are preset parameters equal to or more than 0 and equal to or less than 1.

Through these processes, the corrected pixel value of the target pixel 501 determined as a defective pixel is calculated, and is set as the pixel value of the target pixel.

These processes, for example, are performed by the image signal correction section 200 in the image processing unit 120 of the imaging apparatus 100 illustrated in FIG. 2.

A corrected image having a set corrected pixel value is output to the signal processing section 250, wherein the signal processing section 250 performs the same process as a signal processing section in an existing camera, for example, white balance (WB) adjustment, a demosaicing process of setting pixel values of RGB to pixels, and the like, thereby generating and outputting a color image 183.

As described above, in the processes of the present disclosure, using a plurality of pixels, which include a target pixel to be processed and are arranged in the direction in which the pixel value gradient is small, pixels of the same color in the direction are complemented through interpolation when it is determined whether the target pixel is a defective pixel, and a predetermined number or more of reference pixels are set.

Moreover, when performing a correction process for the target pixel determined as the defective pixel, a correction process is performed using a predetermined number or more of reference pixels set through an interpolation process performed according to necessity.

As described above, in the processes of the present disclosure, a process in which the number of reference pixels has been set to be equal to or more than a predetermined number is performed, resulting in the improvement of detection and correction accuracy. Furthermore, since the same RGB color of pixels can be prepared in all directions, a process based on the same algorithm can be performed with the same color in all directions, so that a process can be performed using the same processing circuit, resulting in a reduction of a circuit size. Furthermore, it is possible to reduce comparative merits and demerits of correction due to a pixel array, that is, the difference between a favorable direction and an unfavorable direction of the correction. Particularly, favorable effects are obtained in pixels with a wide sampling interval.

8. Variation of Defect Correction Process

Figure 26:
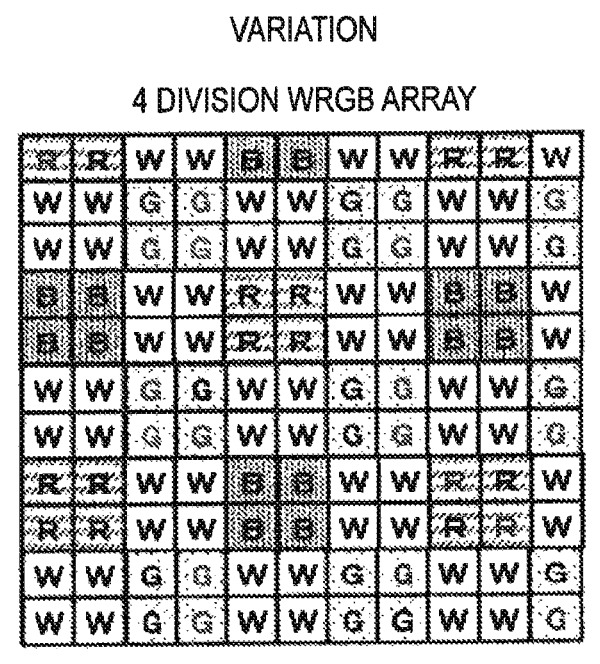

The aforementioned processing examples have been described for the 4-division Bayer RGB array described with reference to (2) of FIG. 1. However, even for the aforementioned defect detection and correction process, similarly to the above direction determination process, the processes of the present disclosure can be applied to image data of the other arrays, for example, various arrays such as the Bayer array illustrated in (1) of FIG. 1, the WRGB array illustrated in (3) of FIG. 1, or the 4-division WRGB array illustrated in FIG. 26.

Furthermore, in the aforementioned embodiment, the processing example in which the pixel interpolation is performed when the defect detection process is performed has been described. However, it may be possible to employ a configuration in which the pixel interpolation is performed when the correction process is performed without performing the pixel interpolation at the time of the defect detection. Furthermore, it may be possible to employ a configuration in which the pixel interpolation is performed at the time of the direction determination.

9. Processing Example in Which Highlight Error Correction Determination is Performed Next, processing in which highlight error correction determination is performed will be described with reference to FIG. 27 and subsequent diagrams.

For example, if a starry sky is photographed, stars are photographed as brightness in the midst of darkness. In an image photographed by a camera, since points and high luminance pixels are set in low luminance pixels, the high luminance pixels may be determined as defective pixels. If the high luminance pixels are recognized as the defective pixels, pixels indicating the original stars are corrected with pixel values equal to those of peripheral pixels, that is, the low luminance pixels. This erroneous correction will be referred to as highlight error correction.

Hereinafter, a description will be provided for an embodiment in which it is verified whether correction performed in order to correct a defective pixel is highlight error correction, and a pixel value before the correction is output when it is determined that the correction is the highlight error correction.

Figure 27:
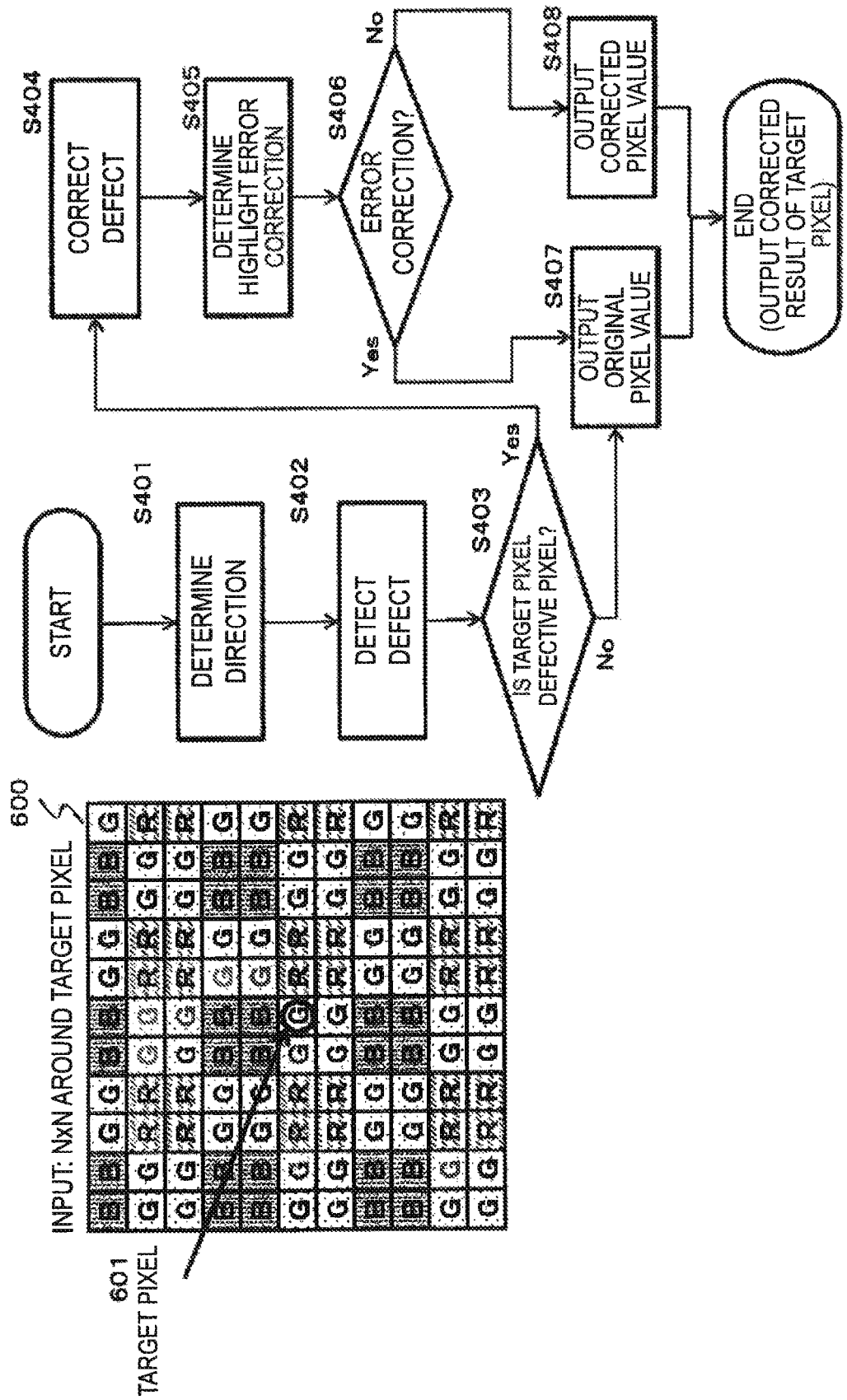
FIG. 27 is a diagram for explaining a processing example including highlight error correction detection performed by an image processing apparatus of the present disclosure.

FIG. 27 illustrates a flowchart for explaining a processing sequence of the present embodiment.

A process according to the flowchart illustrated in FIG. 27 is performed by the image signal correction section 200 in the image processing unit 120 of FIG. 2.

In step S401, the image signal correction section 200 selects one pixel (a target pixel) to be processed from a captured image input from the image sensor 110, and performs direction determination of a pixel value gradient with reference to a pixel area (for example, N×N pixels) around the target pixel.

The input image, for example, is an image 600 illustrated in FIG. 27, and is an image of N×N pixels about a target pixel 601.

The direction determination process of step S401 is equal to the direction determination process of step S101 of the flowchart of FIG. 3 described above. That is, the image signal correction section 200 generates a direction in which the pixel value gradient is minimal as a direction determination result.

The direction in which the pixel value gradient is minimal corresponds to an edge direction, and is a direction in which a change in a pixel value is small. Meanwhile, a direction perpendicular to the edge direction has a large pixel value gradient and is a direction in which a change in the pixel value is large.

In addition, for example, when a process for the target pixel is performed, the process is performed with reference to the pixel area 600 of N×N pixels about the target pixel 601 as illustrated in FIG. 27. In an example illustrated in FIG. 27, N is 11.

In step S402, the image signal correction section 200 performs a defect detection process to determine whether the target pixel is a defective pixel.

The defect detection process of step S402 is equivalent to the defect detection process of step S102 of the flowchart of FIG. 3 described above. That is, the image signal correction section 200 performs defect detection based on the Laplacian calculation described with reference to FIG. 17 to FIG. 23.

Step S403 is a branch step corresponding to a result regarding whether the target pixel is the defective pixel.

When it is determined that the target pixel is not the defective pixel, the image signal correction section 200 proceeds to step S407 to output an original pixel value before correction.

Meanwhile, when it is determined that the target pixel is the defective pixel, the image signal correction section 200 proceeds to step S404 to perform a correction process.

The correction process of step S404 is equivalent to the defect correction process of step S103 of the flowchart of FIG. 3 described above. That is, the image signal correction section 200 performs the pixel value correction process described with reference to FIG. 24 and FIG. 25.

Next, the image signal correction section 200 proceeds to step S405 to perform a process of determining whether the correction process performed in step S404 is highlight error correction.

In steps S405 to S408, the image signal correction section 200 determines and outputs an output pixel value of the target pixel as follows according to a determination result regarding whether the correction process performed in step S404 is the highlight error correction.

That is, when it is determined that the correction process performed in step S404 is not the highlight error correction, the image signal correction section 200 proceeds to step S408 to output a corrected pixel value.

Meanwhile, when it is determined that the correction process performed in step S404 is the highlight error correction, the image signal correction section 200 proceeds to step S407 to output an original pixel value before the correction.

Details of the highlight error correction determination process and the output pixel value determination process will be described with reference to FIG. 28 to FIG. 30.

Figure 28:
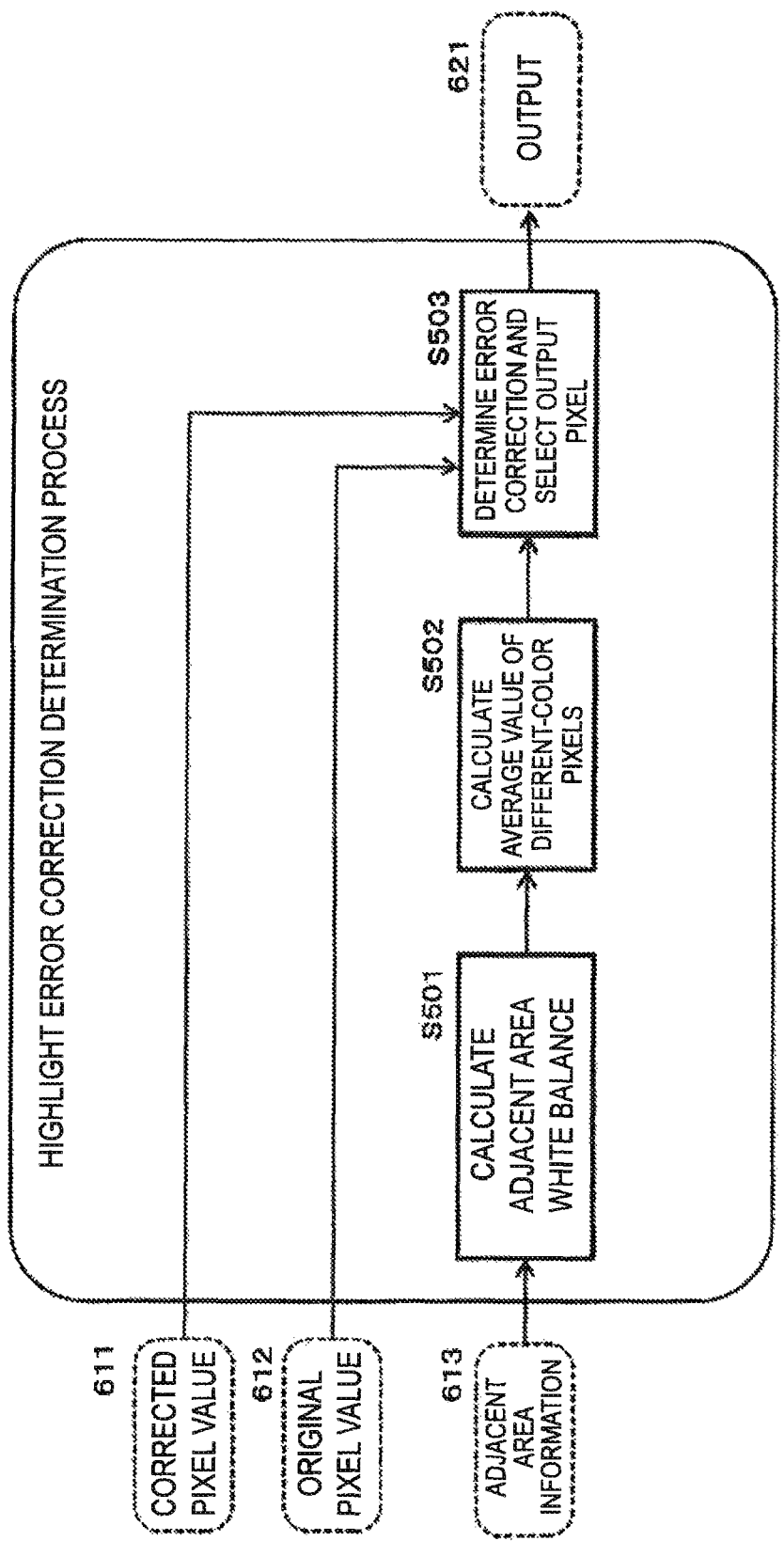
FIG. 28 is a diagram for explaining a processing example including highlight error correction detection performed by an image processing apparatus of the present disclosure.

FIG. 28 is a diagram for explaining detailed processing of the highlight error correction determination process and the output pixel value determination process.

In the highlight error correction determination process, the image signal correction section 200 receives a corrected pixel value 611 of the target pixel to be processed, an original pixel value 612 before correction of the target pixel to be processed, and information 613 on an adjacent area (for example, an area of N×N pixels about the target pixel) of the target pixel to be processed.

In step S501, the image signal correction section 200 performs white balance calculation for the adjacent area information 613 of the target pixel.

This process will be described with reference to FIG. 29.

Figure 29:
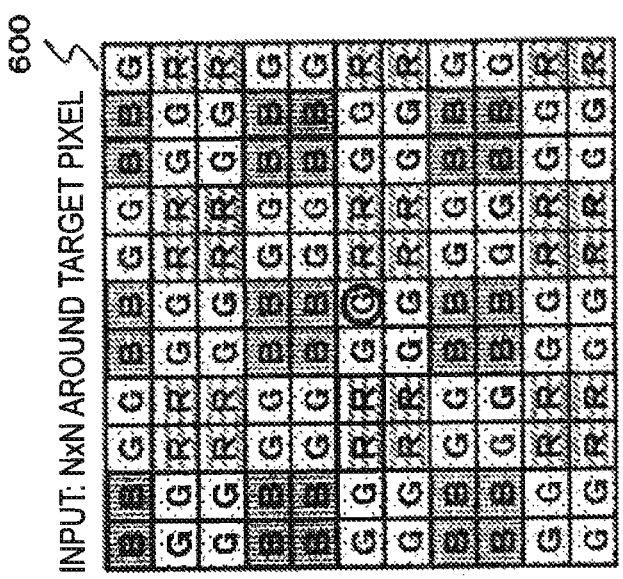
FIG. 29 is a diagram for explaining a processing example including highlight error correction detection performed by an image processing apparatus of the present disclosure.

FIG. 29 illustrates the pixel area 600 of N×N pixels as the adjacent area information about a target pixel 601.

The image signal correction section 200 calculates white balance of the pixel area 600.

The white balance is calculated as a ratio of pixel value averages aveR, aveG, and aveB of RGB calculated in the pixel area 600.

In detail, the image signal correction section 200 calculates the white balance according to an equation below.

$$aveR = \frac{1}{N_R}\sum_{i=1}^{N_R} R_i$$

$$aveG = \frac{1}{N_G}\sum_{i=1}^{N_G} G_i$$

$$aveB = \frac{1}{N_B}\sum_{i=1}^{N_B} B_i$$

$$\text{white-balance} = \frac{aveG}{aveR}, \frac{aveG}{aveB}$$

In step S501 of FIG. 28, the image signal correction section 200 calculates the white balance in the adjacent area of the target pixel according to the equation above.

In step S502, the image signal correction section 200 calculates an average value of different-color pixels. The average value of different color pixels is an average value of pixels with colors different from that of the target pixel to be subject to the highlight error correction.

Figure 30:
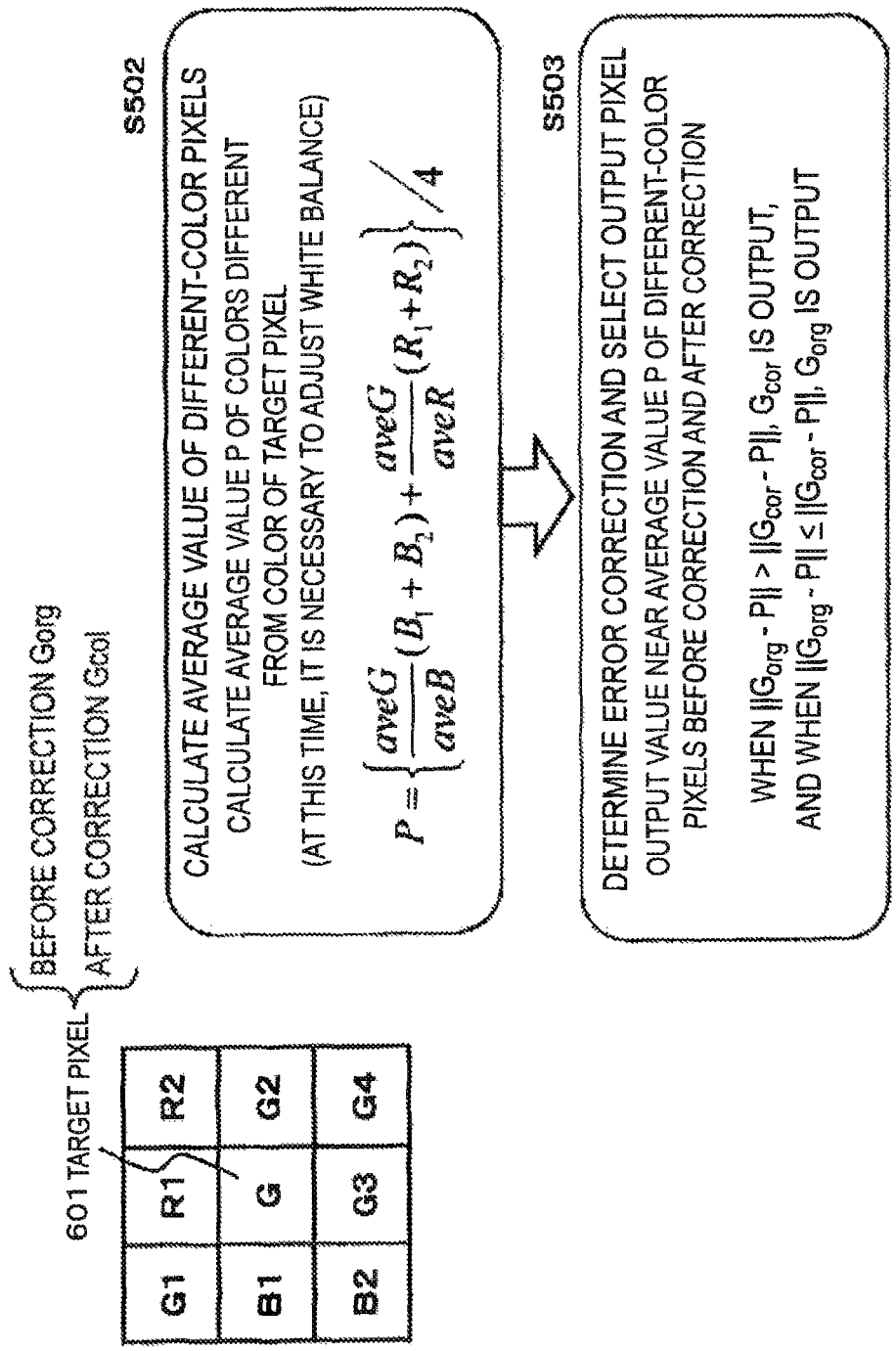
FIG. 30 is a diagram for explaining a processing example including highlight error correction detection performed by an image processing apparatus of the present disclosure.

The average value P of different-color pixels, for example, is calculated according to an equation below as illustrated in FIG. 30.

$$P = \left\{\frac{aveG}{aveB}(B_1 + B_2) + \frac{aveG}{aveR}(R_1 + R_2)\right\}/4$$

This equation corresponds to a calculation example in which the average value P of different-color pixels is calculated when the target pixel is a G pixel. As illustrated in FIG. 30, the image signal correction section 200 selects different-color pixels B1, B2, R1, and R2 from eight pixels around the target pixel 601, and calculates the average value P of different-color pixels using the previously calculated white balance values aveG/aveR and aveG/aveB.

In addition, the equation corresponds to the calculation example when the target pixel is the G pixel. However, when the target pixel is a B or R pixel, the image signal correction section 200 selects pixels with colors different from that of the target pixel from around the target pixel, adds pixels values of the pixels in units of colors, and performs white balance adjustment, thereby calculating the average value P of different-color pixels.

In step S503, the image signal correction section 200 determines whether or not the defect correction performed in step S404 of FIG. 27 is the highlight error correction, and determines whether to allow an output pixel to have a corrected pixel value or an original pixel value according to a determination result.

This output pixel selection process is performed according to equations below as illustrated in FIG. 30.

When G is output.

When $\|G_{org}-P\| > \|G_{cor}-P\|$, $G_{cor}$ is output.

When $\|G_{org}-P\| \leq \|G_{cor}-P\|$, $G_{org}$ is output.

In the equation above, $G_{org}$ denotes the original pixel value of the target pixel, $G_{cor}$ notes the corrected pixel value of the target pixel, and P denotes an implanted pixel value.

That is, the image signal correction section 200 outputs a value near the average value P of different-color pixels before the correction and after the correction.

When the difference between the corrected pixel value after the correction and the average value P of different-color pixels is equal to or more than the difference between the original pixel value before the correction and the average value P of different-color pixels, the image signal correction section 200 determines that the correction is the highlight error correction, and performs a process of outputting the original pixel value.

When the difference between the corrected pixel value after the correction and the average value P of different-color pixels is smaller than the difference between the original pixel value before the correction and the average value P of different-color pixels, the image signal correction section 200 determines that the correction is not the highlight error correction but appropriate correction, and performs a process of outputting the corrected pixel value.

The processes of step S405 to S408 of the flowchart of FIG. 27 are performed as the processes described with reference to FIG. 28 to FIG. 30.

Through these processes, when the highlight error correction has been performed, it is possible to output the original pixel value.

10. Conclusion of Configuration of Present Disclosure

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below.

(1) An image processing apparatus comprising:
an image signal correction section configured to perform an image correction process,
wherein the image signal correction section performs:

a direction determination process of detecting a direction having a minimum pixel value gradient as a pixel value gradient direction in a pixel area including a target pixel;

a defect detection process of calculating a Laplacian based on a pixel value of a reference pixel in a minimum gradient direction detected in the direction determination process with respect to the target pixel, and determining presence or absence of a defect of the target pixel; and a defect correction process of performing calculation of a corrected pixel value, which is obtained by applying the pixel value of the reference pixel in the direction detected in the direction determination process, with respect to a target pixel from which a defect has been detected in the defect detection process, wherein the direction determination process is performed using a weighted addition result of a plurality of types of gradient information calculated through a plurality of different gradient detection processes.

(2) The image processing apparatus according to (1), wherein the image signal correction section calculates pixel value gradient information corresponding to a high frequency texture, pixel value gradient information corresponding to a low frequency texture, and pixel value gradient information corresponding to a luminance signal in the direction determination process, and detects a direction having a minimum pixel value gradient based on a weighted addition result of the three types of gradient information.

(3) The image processing apparatus according to (2), wherein the image signal correction section calculates the pixel value gradient information corresponding to the high frequency texture using a pixel value difference of adjacent pixels, and calculates the pixel value gradient information corresponding to the low frequency texture using a pixel value difference of nonadjacent pixels.

(4) The image processing apparatus according to (2) or (3), wherein the image signal correction section calculates a luminance signal based on pixel values of RGB pixels in units of pixel areas including the RGB pixels, and calculates the pixel value gradient information corresponding to the luminance signal using the calculated luminance signal in units of areas.

(5) The image processing apparatus according to any one of (1) to (4), wherein the image signal correction section performs a process of changing a weight set in the weighted addition process of the three types of gradient information according to resolution of an output image, sets a weight of the pixel value gradient information corresponding to the high frequency texture to be higher than weights of other types of gradient information when the resolution of the output image is high, and sets a weight of the pixel value gradient information corresponding to the low frequency texture to be higher than weights of other types of gradient information when the resolution of the output image is low.

(6) The image processing apparatus according to any one of (1) to (5), wherein the image signal correction section performs a process of changing a weight set in the weighted addition process of the three types of gradient information according to a frequency band of an input image to be processed, sets a weight of the pixel value gradient information corresponding to the high frequency texture to be higher than weights of other types of gradient information when the input image includes many high frequency regions, and sets a weight of the pixel value gradient information corresponding to the low frequency texture to be higher than weights of other types of gradient information when the input image includes many low frequency regions.

(7) The image processing apparatus according to any one of (1) to (6), wherein the image signal correction section performs pixel value correction of an image in which RGB colors are arranged in 2×2 units of four pixels, or an image in which RGBW colors are arranged in 2×2 units of four pixels.

(8) The image processing apparatus according to any one of (1) to (7), wherein, in the defect detection process, the image signal correction section selects a pixel with a color equal to a color of a target pixel, which is to be subject to defect detection, from the minimum gradient direction as a reference pixel, compares a plurality of Laplacians calculated based on different combinations of the target pixel and the selected pixel with a predetermined threshold value, and determines whether the target pixel is a defective pixel based on a result of the comparison.

(9) The image processing apparatus according to (8), wherein the image signal correction section selects four pixels with a color equal to the color of the target pixel, which is to be subject to the defect detection, from the minimum gradient direction as reference pixels, compares three Laplacians calculated based on different combinations of the target pixel and the two selected pixels with a predetermined threshold value, and determines that the target pixel is a defective pixel when all three of the Laplacians are larger than the threshold value.

(10) The image processing apparatus according to (8) or (9), wherein, in the defect detection process, when only four pixels with a color equal to the color of the target pixel, which is to be subject to the defect detection, are unselectable from the minimum gradient direction in a predetermined reference area, the image signal correction section performs pixel interpolation on a position of a pixel with a color different from the color of the target pixel in the minimum gradient direction based on a pixel value of a pixel with a color equal to the color of the target pixel around the position of the pixel with the different color, and sets an interpolation pixel generated through the pixel interpolation as a reference pixel.

(11) The image processing apparatus according to any one of (8) to (10), wherein, in the defect correction process, the image signal correction section calculates a corrected pixel value of the target pixel through weighted addition of a pixel value of the reference pixel.

(12) The image processing apparatus according to any one of (8) to (11), wherein, in the defect detection process, the image signal correction section calculates a pixel value gradient between two reference pixels at both sides of the target pixel, and calculates a corrected pixel value of the target pixel through weighted addition of pixel values of two pixels in a direction in which the pixel value gradient is small.

(13) The image processing apparatus according to any one of (1) to (12), wherein the image signal correction section performs a highlight error correction determination process of determining whether or not the correction process performed in the defect detection process is highlight error correction, outputs an original pixel value before the correction when it is determined that the correction process is the highlight error correction, and outputs a corrected pixel value when it is determined that the correction process is not the highlight error correction.

Addition, the configuration of the present disclosure is included in a method of performing a process to be performed in the aforementioned apparatus and system, a program for allowing the process to be performed, and a recording medium recording the program.

Furthermore, a series of processes described in the specification can be performed by hardware, software or a composite configuration thereof. When the processes are performed by software, a program recording a process sequence can be executed after being installed in a memory in a computer embedded in dedicated hardware, or the program can be executed after being installed in a general purpose computer capable of performing various processes. For example, the program can be recorded on a recording medium in advance. In addition to the installation from a recording medium to a computer, the program can be received through a network such as a local area network (LAN) or the Internet, and can be installed on a recording medium such as an embedded hard disk.

In addition, various processes described in the specification may not only be performed in time series according to a description, but may also be performed in a parallel or individual manner according to processing capability of an apparatus for performing processes or necessity. Furthermore, the system in the present specification corresponds to a logical aggregate configuration of a plurality of apparatuses and the apparatuses of each configuration are not necessary in the same housing.

So far, as described above, according to the configuration of an embodiment of the present disclosure, an apparatus and method capable of performing defect detection and correction with high accuracy with respect to an image having pixel arrays variously set are provided.

In detail, a plurality of different techniques are applied to a pixel area including a target pixel, so that various types of gradient detection information are acquired. Moreover, a minimum gradient direction is detected based on weighted addition of the various types of gradient detection information. Moreover, a Laplacian is calculated based on a pixel value of a reference pixel having the same color as the target pixel in the detected minimum gradient direction to determine defect presence/absence of the target pixel. Moreover, the pixel value of the reference pixel in a direction detected in a direction determination process is applied to a target pixel from which a defect has been detected, so that a corrected pixel value is calculated.

Through the present processes, the apparatus and method capable of performing defect detection and correction with high accuracy with respect to an image having pixel arrays variously set are realized.

What is claimed is:

1. An image processing apparatus comprising:
an image processing section configured to include a defect detection unit, a direction determination unit, and a defect correction unit,
wherein the direction determination unit detects a gradient direction having a minimum pixel value gradient as a pixel value gradient direction in a pixel area including a target pixel, by using a weighted addition result of a plurality of types of gradient information calculated through a plurality of different gradient detection processes,
wherein the defect detection unit calculates, based on an output image resolution of a plurality of output image resolutions, a corrected pixel value obtained by applying the pixel value gradient direction detected in the direction determination unit with respect to the target pixel found within the pixel area using weights in the weighted addition result determined according to the output image resolution, wherein the pixel section is configured to include a plurality of pixel groups, each of the pixel groups including at least two pixels, and wherein the image processing section including the defect detection unit, the direction determination unit, and the defect correction unit are each implemented via at least one processor.

2. The image processing apparatus according to claim 1, wherein the pixel area is a part of the pixel section.

3. The image processing apparatus according to claim 1, wherein the defect detection unit calculates a Laplacian based on a pixel value of a reference pixel in a minimum gradient direction with respect to the target pixel, and determines presence or absence of a defect of the target pixel.

4. The image processing apparatus according to claim 1, wherein the defect detection unit calculates pixel value gradient information corresponding to a high frequency texture, pixel value gradient information corresponding to a low frequency texture, and pixel value gradient information corresponding to a luminance signal, and detects a direction having a minimum pixel value gradient based on a weighted addition result of the three types of gradient information.

5. The image processing apparatus according to claim 1, wherein the defect correction unit selects, for subjection to defect detection, a pixel with a color equal to a color of the target pixel, and wherein the defect detection unit, from the minimum gradient direction as a reference pixel, compares a plurality of Laplacians calculated based on different combinations of the target pixel and the selected pixel with a predetermined threshold value, and determines whether the target pixel is a defective pixel based on a result of the comparison.

6. The image processing apparatus according to claim 1, wherein the defect correction unit calculates pixel value gradient information corresponding to a high frequency texture using a pixel value difference of adjacent pixels, and calculates pixel value gradient information corresponding to a low frequency texture using a pixel value difference of non-adjacent pixels.

7. The image processing apparatus according to claim 1, wherein the defect correction unit calculates a luminance signal based on pixel values of RGB pixels in units of pixel areas including the RGB pixels, and calculates pixel value gradient information corresponding to the luminance signal using the calculated luminance signal in units of areas.

8. An image processing method, performed via at least one processor, the method comprising:

calculating, based on an output image resolution of a plurality of output image resolutions, a corrected pixel value obtained by applying a detected pixel value gradient direction with respect to a target pixel found within a pixel area using a weighted addition result of a plurality of types of gradient information calculated through a plurality of different gradient detection processes;

detecting a defect of the target pixel based on the detected pixel value gradient direction; and calculating the corrected pixel value based on the target pixel within which the defect has been detected to be present using weights in the weighted addition result determined according to the output image resolution, wherein the pixel section is configured to include a plurality of pixel groups, each of the pixel groups including at least two pixels.

9. A non-transitory computer-readable medium having embodied thereon a program, which when executed by a computer causes the computer to execute an image processing method, the method comprising:

calculating, based on an output image resolution of a plurality of output image resolutions, a corrected pixel value obtained by applying a detected pixel value gradient direction with respect to a target pixel found within a pixel area using a weighted addition result of a plurality of types of gradient information calculated through a plurality of different gradient detection processes;

detecting a defect of the target pixel based on the detected pixel value gradient direction; and calculating the corrected pixel value based on the target pixel within which the defect has been detected to be present using weights in the weighted addition result determined according to the output image resolution, wherein the pixel section is configured to include a plurality of pixel groups, each of the pixel groups including at least two pixels.

* * * * *